US011536366B2

(12) United States Patent
Shiotsu et al.

(10) Patent No.: US 11,536,366 B2
(45) Date of Patent: Dec. 27, 2022

(54) SHIFT MECHANISM FOR POWER TRANSMISSION DEVICE

(71) Applicants: KABUSHIKI KAISHA TOYOTA CHUO KENKYUSHO, Nagakute (JP); TOYOTA JIDOSHA KABUSHIKI KAISHA, Toyota (JP)

(72) Inventors: Isamu Shiotsu, Nagakute (JP); Hirotsugu Yoshino, Susono (JP); Hideaki Komada, Gotemba (JP); Yosuke Suzuki, Hadano (JP)

(73) Assignees: KABUSHIKI KAISHA TOYOTA CHUO KENKYUSHO, Nagakute (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 46 days.

(21) Appl. No.: 17/234,331

(22) Filed: Apr. 19, 2021

(65) Prior Publication Data

US 2021/0239208 A1 Aug. 5, 2021

Related U.S. Application Data

(63) Continuation of application No. 16/385,024, filed on Apr. 16, 2019, now Pat. No. 11,009,127.

(30) Foreign Application Priority Data

Apr. 27, 2018 (JP) .............................. JP2018-086858
Mar. 4, 2019 (JP) .............................. JP2019-038275

(51) Int. Cl.
*F16H 63/18* (2006.01)
(52) U.S. Cl.
CPC .................................. *F16H 63/18* (2013.01)

(58) Field of Classification Search
CPC ....................................................... F16H 63/18
See application file for complete search history.

(56) References Cited

U.S. PATENT DOCUMENTS 4,455,884 A 6/1984 Tsuruta et al.
8,596,152 B2 * 12/2013 Piacenza ................ F16H 63/18
74/337.5

(Continued)

FOREIGN PATENT DOCUMENTS

JP 2009-197837 A 9/2009
JP 4832204 B2 12/2011
JP 2015-532968 A 11/2015

OTHER PUBLICATIONS

Mar. 31, 2020 Office Action issued in Japanese Patent Application No. 2019-038275.

(Continued)

*Primary Examiner* — Terence Boes
(74) *Attorney, Agent, or Firm* — Oliff PLC

(57) ABSTRACT

A shift mechanism switches power transmission paths among a first transmission shaft, a second transmission shaft, and a third transmission shaft that are concentrically arranged on a rotational axis. The shift mechanism has a drive drum that is provided so as to be coaxial with the rotational axis and pivotable about the rotational axis, and a first driven drum and a second driven drum that are arranged on the rotational axis so as to be concentric with the drive drum and move along the rotational axis as the drive drum pivots. As the first driven drum moves, a first shift sleeve advances and retreats, and the first transmission shaft and the second transmission shaft are connected and disconnected. In addition, as the second driven drum moves, a second shift sleeve advances and retreats, and the second transmission shaft and the third transmission shaft are connected and disconnected.

5 Claims, 12 Drawing Sheets

(56) References Cited

U.S. PATENT DOCUMENTS

| | | | |
|---|---|---|---|
| 2006/0162487 A1 | 7/2006 | Chappelear et al. | |
| 2007/0000340 A1 | 1/2007 | Kapp et al. | |
| 2007/0240530 A1 | 10/2007 | Ogami et al. | |
| 2010/0294070 A1 | 11/2010 | Akashi et al. | |
| 2015/0211633 A1 | 7/2015 | Thompson | |
| 2015/0247574 A1 | 9/2015 | VanDruten et al. | |
| 2017/0152947 A1 | 6/2017 | Imafuku | |
| 2018/0135751 A1 | 5/2018 | Maki | |
| 2019/0331219 A1* | 10/2019 | Shiotsu | F16D 11/14 |
| 2020/0248803 A1* | 8/2020 | Hamajima | B23P 17/00 |
| 2020/0256400 A1* | 8/2020 | Yanagida | H04L 41/0613 |
| 2021/0332883 A1* | 10/2021 | Toyama | B23P 19/00 |

OTHER PUBLICATIONS

U.S. Appl. No. 16/385,024, filed Apr. 16, 2019 in the name of Shiotsu et al.
Feb. 10, 2021 Notice of Allowance issued in U.S. Appl. No. 16/385,024.

* cited by examiner

SHIFT MECHANISM FOR POWER TRANSMISSION DEVICE

CROSS REFERENCE TO RELATED APPLICATIONS

This application is a continuation of U.S. application Ser. No. 16/385,024, filed on Apr. 16, 2019, which claims priority to Japanese Patent Application Nos. 2018-086858, filed on Apr. 27, 2018 and 2019-038275, filed on Mar. 4, 2019, the specifications, claims, drawings, and abstracts of each of which are hereby incorporated by reference in their entirety.

TECHNICAL FIELD

The present disclosure relates to a shift mechanism for switching power transmission paths in a power transmission device.

BACKGROUND

Patent Document 1 below discloses a vehicle speed change device. The speed change device is a device for switching gear trains that are power transmission paths; that is, the device has a shift mechanism for switching the power transmission paths. Patent Document 1 below discloses the speed change device having first and second main shafts (15, 16) that are coaxially arranged, and a counter shaft (17) located in parallel to the first and second main shafts (15, 16). The shift mechanism of this speed change device has a shift drum (100) located along an axis different from that of the first and second main shafts (15, 16) and that of the counter shaft (17).

On the shift drum (100), cam grooves (101, 102, 103) are formed to be engaged with shift forks (96, 97, 98). The shift forks (96, 97, 98) are engaged with shifters (87, 94, 95). By moving on the shafts (16, 17), the shifters (87, 94, 95) can be engaged with any one of the gears arranged on either side or reach a neutral state where they are not engaged with any gears.

As the shift drum (100) pivots, the shift forks (96, 97, 98) move according to the profiles of the cam grooves (101, 102, 103), and gears to be engaged are selected, thereby switching gear trains.

The reference numerals in the parentheses above are the reference numerals used in Patent Document 1 below, and they do not relate to those used in describing embodiments of the present application.

CITATION LIST

Patent Literature

Patent Document 1: JP 4832204 B

SUMMARY

Technical Problem

In Patent Document 1 above, the shift drum is located on the axis different from that of the first and second main shafts and that of the counter shaft, and therefore, the radial dimension tends to be large.

An object of the present disclosure is to provide a shift mechanism for a power transmission device which can be reduced in radial size.

Solution to Problem

A shift mechanism for a power transmission device according to the present disclosure switches power transmission paths among a first transmission shaft, a second transmission shaft, and a third transmission shaft that are concentrically arranged on a common rotational axis. The shift mechanism has a first shift sleeve that advances and retreats along the rotational axis and connects and disconnects the first transmission shaft and the second transmission shaft, a second shift sleeve that advances and retreats along the rotational axis and connects and disconnects the second transmission shaft and the third transmission shaft, a drive drum that is provided so as to be coaxial with the rotational axis and pivotable about the rotational axis, a first driven drum that is located on the rotational axis so as to be concentric with the drive drum and moves along the rotational axis as the drive drum pivots, thereby causing the first shift sleeve to advance and retreat, and a second driven drum that is located on the rotational axis so as to be concentric with the drive drum and moves along the rotational axis as the drive drum pivots, thereby causing the second shift sleeve to advance and retreat.

For example, one of the facing surfaces of the drive drum and the first driven drum is provided with a cam groove, and the other one of the surfaces is provided with a pin to be engaged with the cam groove. Similarly, one of the facing surfaces of the drive drum and the second driven drum is provided with a cam groove, and the other one of the surfaces is provided with a pin to be engaged with the cam groove. When the drive drum pivots, the cam grooves and the pins move relatively according to the profiles of the cam grooves, and this causes the first and second driven drums to move along the rotational axis direction. As the first driven drum moves, the first shift sleeve advances and retreats to thereby connect and disconnect the first transmission shaft and the second transmission shaft. In addition, as the second driven drum moves, the second shift sleeve advances and retreats to thereby connect and disconnect the second transmission shaft and the third transmission shaft.

In addition, in the shift mechanism, the drive drum may be provided with a first cam groove and a second cam groove on its circumference surface, and the first driven drum may have a first driven pin engaged with the first cam groove, and the second driven drum may have a second driven pin engaged with the second cam groove. When the first driven pin is driven according to the profile of the first cam groove as the drive drum pivots, the first driven drum moves along the rotational axis. In addition, when the second driven pin is driven according to the profile of the second cam groove as the drive drum pivots, the second driven drum moves along the rotational axis.

Further, in the shift mechanism, the profiles of the first cam groove and the second cam groove provided on the circumferential surface of the drive drum may be circumferentially aligned, and the positions of the first driven pin and the second driven pin may be circumferentially shifted from each other. By circumferentially aligning the profiles of the first cam groove and the second cam groove, the distance between the first cam groove and the second cam groove can be reduced. Even when the profiles of the first cam groove and the second cam groove are circumferentially aligned, the positions of the first driven pin and the second driven pin are circumferentially shifted from each other to enable the first driven drum and the second driven drum to move at different timings.

In addition, in the shift mechanism, the drive drum may have a first drive pin and a second drive pin on its circumferential surface, and the first driven drum is provided with a first cam groove to be engaged with the first drive pin, and the second driven drum is provided with a second cam groove to be engaged with the second drive pin. The first driven drum moves along the rotational axis according to the profile of the first cam groove as the first drive pin pivots in accordance with pivoting of the drive drum, and the second driven drum moves along the rotational axis according to the profile of the second cam groove as the second drive pin pivots in accordance with pivoting of the drive drum. The first cam groove and the second cam groove can be set at any position in the rotational axis direction by providing the first cam groove and second cam groove on the first driven drum and the second driven drum, respectively.

Furthermore, in the shift mechanism, the first driven drum or the second driven drum can be made pivotable about the rotational axis by a predetermined angle. Thus, it becomes possible to reach a state where the first driven drum and the second driven drum move at different timings and a state where the first driven drum and the second driven drum move at the same timing.

It is also possible to arrange the first driven drum on the inner circumferential side of the drive drum and the second driven drum on the outer circumferential side of the drive drum.

It is further possible to provide a single cam groove on the circumferential surface of the drive drum and allow the first driven drum to have a first driven pin engaged with the single cam groove and the second driven drum to have a second driven pin engaged with the single cam groove. When the first driven pin is driven according to the profile of the single cam groove as the drive drum pivots, the first driven drum moves along the rotational axis, and when the second driven pin is driven according to the profile of the single cam groove as the drive drum pivots, the second driven drum moves along the rotational axis. By driving the first driven drum and the second driven drum by means of the single cam groove, the dimension of the drive drum can be smaller in the rotational axis direction than that in the case where two cam grooves are provided.

Furthermore, it is possible to arrange both the first driven drum and the second driven drum on either one of the inner circumferential side and the outer circumferential side of the drive drum.

It is also possible to provide a pin on one of the facing surfaces of the drive drum and the first driven drum and provide, on the other one of the facing surfaces, two cam surfaces that come into contact with the side surface of the pin to restrict movement of the first driven drum in the advancing direction and the retreating direction, respectively. Similarly, it is possible to provide a pin on one of the facing surfaces of the drive drum and the second driven drum and provide, on the other one of the facing surfaces, two cam surfaces that come into contact with the side surface of the pin to restrict movement of the second driven drum in the advancing direction and the retreating direction, respectively. When the drive drum pivots, the cam surfaces and the pin move relatively according to the profiles of the cam surfaces, and this causes the first and second driven drums to move along the rotational axis direction. As the first driven drum moves, the first shift sleeve advances and retreats to thereby connect and disconnect the first transmission shaft and the second transmission shaft. In addition, as the second driven drum moves, the second shift sleeve advances and retreats to thereby connect and disconnect the second transmission shaft and the third transmission shaft. The cam surface restricting movement of the first driven drum in the advancing direction may have no portion for restricting movement of the first driven drum when the first driven drum is in the advanced position. In addition, the cam surface restricting movement of the second driven drum in the advancing direction may have no portion for restricting movement of the second driven drum when the second driven drum is in the advanced position.

Advantageous Effect of the Invention

According to the present disclosure, the drive drum is located so as to be concentric with the first transmission shaft, the second transmission shaft, and the third transmission shaft, and therefore, it is possible to make the radial dimension smaller than that in the case where the drive drum is located on a different axis.

BRIEF DESCRIPTION OF DRAWINGS

Embodiments of the present disclosure will be described by reference to the following figures wherein.

DESCRIPTION OF EMBODIMENTS

Figure 1:
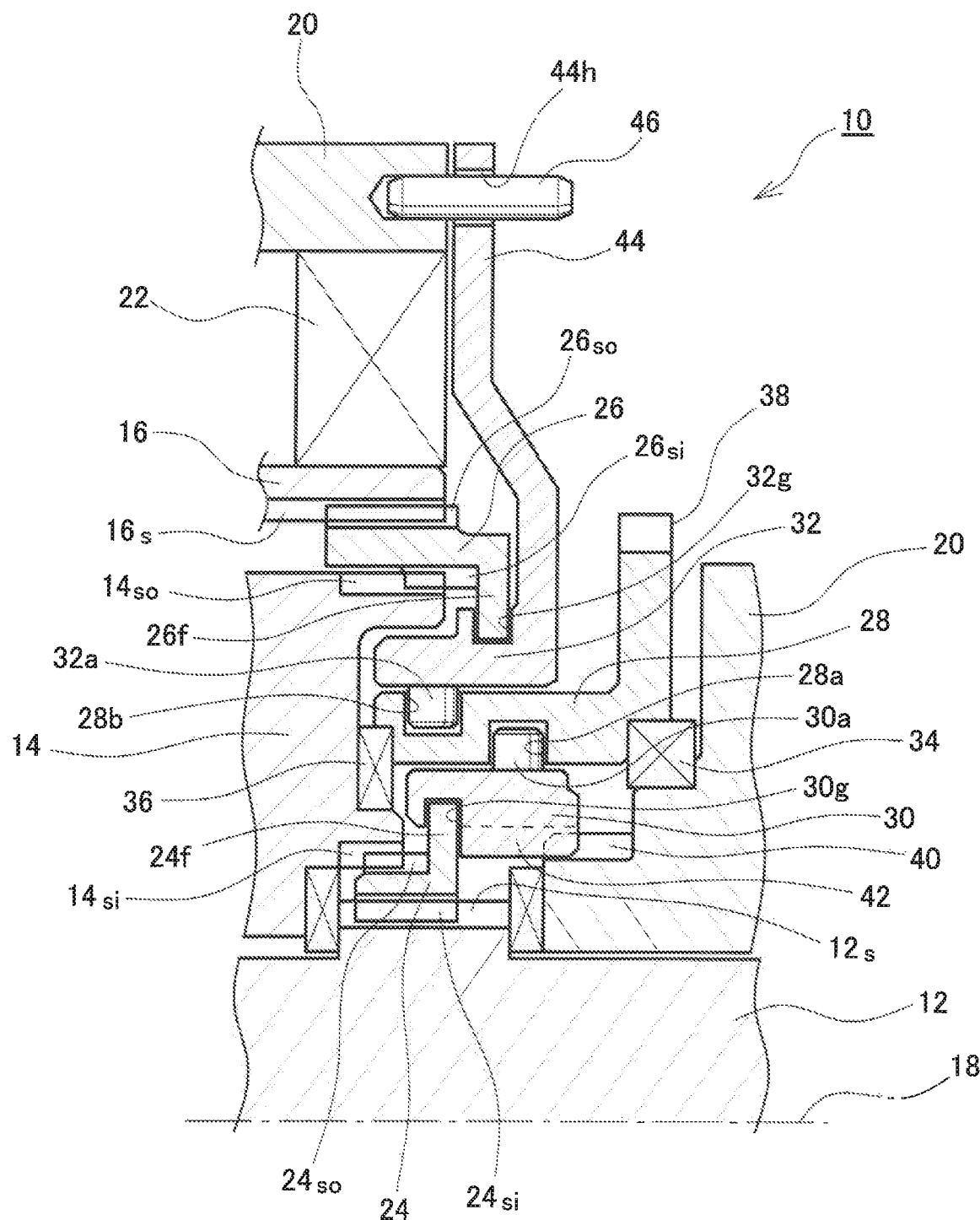
FIG. 1 is a cross-sectional view showing a schematic structure of a shift mechanism for a power transmission device according to the present embodiment, in which three transmission shafts are connected.
Figure 2:
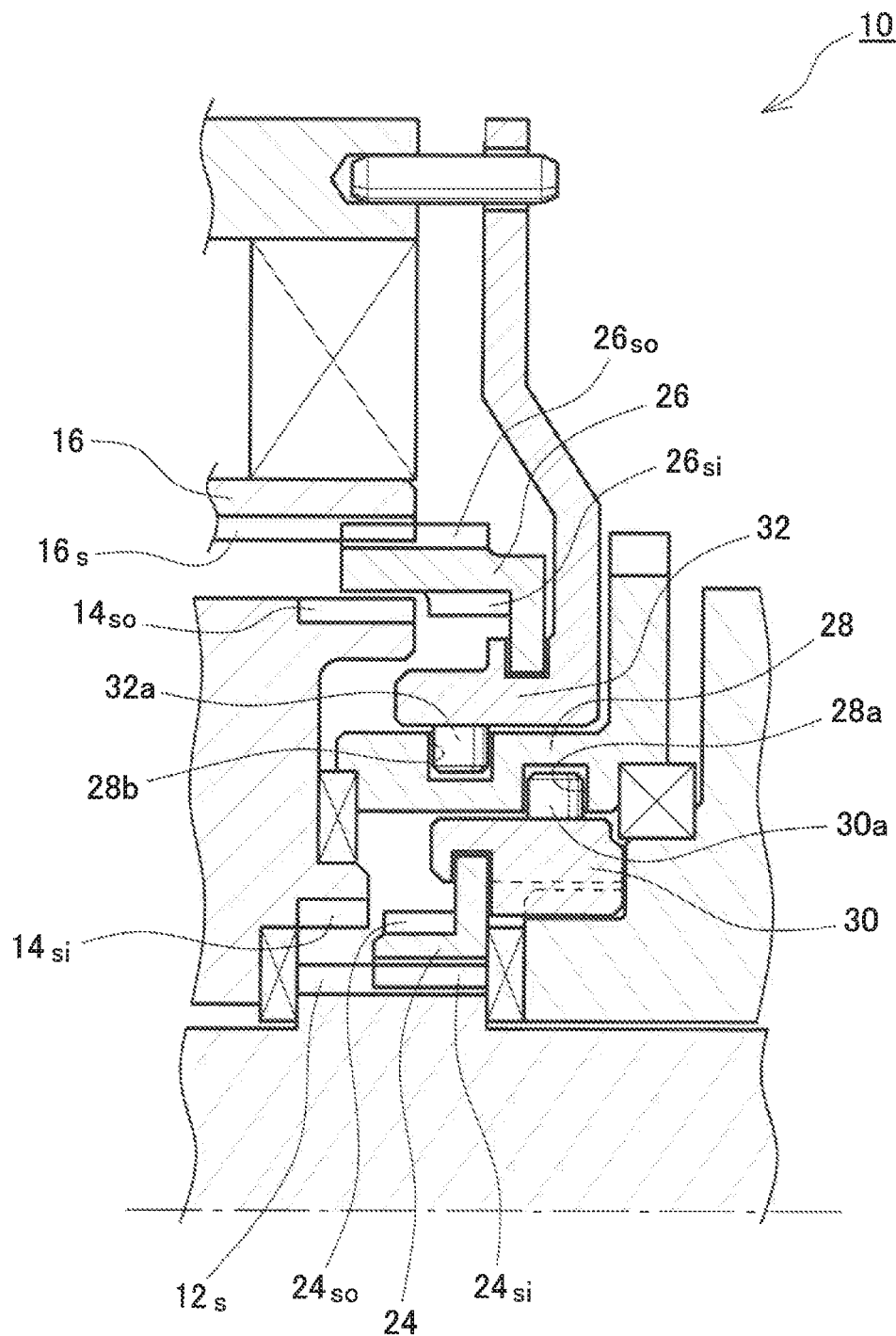
FIG. 2 is a cross-sectional view showing a schematic structure of the shift mechanism for the power transmission device according to the present embodiment, in which the three transmission shafts are disconnected.

Hereinafter, embodiments of the present disclosure will be described with reference to the drawings. FIGS. 1 and 2 are cross-sectional views showing a schematic structure of a shift mechanism 10 for a power transmission device. The shift mechanism 10 is a mechanism for switching power transmission paths among three transmission shafts 12, 14, and 16. The three transmission shafts 12, 14, and 16 are concentrically arranged so as to be rotatable around a common rotational axis 18. The portion below the rotational axis 18 is omitted from FIGS. 1 and 2. The transmission shaft 12 located on the innermost side will be referred to as the first transmission shaft 12, and the hollow transmission shaft 14 located so as to surround the first transmission shaft 12 will be referred to as the second transmission shaft 14. Further, the hollow transmission shaft 16 located further outside so as to surround the first and second transmission shafts 12 and 14 will be referred to as the third transmission shaft.

The first to third transmission shafts 12, 14, and 16 are rotatably supported by a case 20. For example, the first transmission shaft 12 is supported by the case 20 via a bearing (not shown), and the third transmission shaft 16 is supported by the case 20 via a bearing 22. In addition, for example, the second transmission shaft 14 is supported by the case 20 via one or both of a bearing (not shown) provided between the second transmission shaft 14 and the outer third transmission shaft 16 and a bearing (not shown) provided between the second transmission shaft 14 and the inner first transmission shaft 12. Whether the first transmission shaft 12 and the second transmission shaft 14 are connected or disconnected; that is, connection and disconnection between the first transmission shaft 12 and the second transmission shaft 14, is selected by advancing and retreating of a first shift sleeve 24 in the direction along the rotational axis 18. In addition, connection and disconnection between the second transmission shaft 14 and the third transmission shaft 16 is selected by advancing and retreating of a second shift sleeve 26 in the direction along the rotational axis 18. The first shift sleeve 24 and the second shift sleeve 26 have an annular shape and are concentrically arranged with respect to the rotational axis 18.

A spline 12s is formed on the outer circumferential surface of the first transmission shaft 12. On the inner circumferential surface of the first shift sleeve 24, there is formed an inner circumferential spline 24si to mesh with the spline 12s of the first transmission shaft. Meshing of the spline 12s of the first transmission shaft with the inner circumferential spline 24si of the first shift sleeve causes the first shift sleeve 24 to rotate integrally with the first transmission shaft 12. The first shift sleeve 24 can also move on the spline 12s of the first transmission shaft in the direction along the rotational axis 18. The meshing of the spline 12s with the inner circumferential spline 24si is maintained in the range of movement of the first shift sleeve 24. The first shift sleeve 24 also has an annular outward flange 24f on its outer circumferential surface.

An inner circumferential spline 14si is formed on the inner circumferential surface of the second transmission shaft 14. On the outer circumferential surface of the first shift sleeve 24, there is formed an outer circumferential spline 24so that is able to mesh with the inner circumferential spline 14si of the second transmission shaft. The meshing state between the outer circumferential spline 24so of the first shift sleeve and the inner circumferential spline 14si of the second transmission shaft is switched according to a position of the first shift sleeve 24 in the direction of the rotational axis 18. As shown in FIG. 1, when the first shift sleeve 24 advances toward the second transmission shaft 14, the outer circumferential spline 24so and the inner circumferential spline 14si mesh with each other. This meshing causes the second transmission shaft 14 to rotate integrally with the first transmission shaft 12 via the first shift sleeve 24. As shown in FIG. 2, when the first shift sleeve 24 retreats from the second transmission shaft 14, the meshing between the outer circumferential spline 24so and the inner circumferential spline 14si is released, and the second transmission shaft 14 becomes rotatable with respect to the first transmission shaft 12.

A spline 16s is formed on the inner circumferential surface of the third transmission shaft 16. On the outer circumferential surface of the second shift sleeve 26, there is formed an outer circumferential spline 26so to mesh with the spline 16s of the third transmission shaft. Meshing of the spline 16s of the third transmission shaft with the outer circumferential spline 26so of the second shift sleeve causes the second shift sleeve 26 to rotate integrally with the third transmission shaft 16. The second shift sleeve 26 can also move on the spline 16s of the third transmission shaft in the direction along the rotational axis 18. The meshing of the spline 16s with the outer circumferential spline 24so is maintained in the range of movement of the second shift sleeve 26. The second shift sleeve 26 also has an annular inward flange 26f on its inner circumferential surface.

An outer circumferential spline 14so is formed on the outer circumferential surface of the second transmission shaft 14. On the inner circumferential surface of the second shift sleeve 26, there is formed an inner circumferential spline 26si that is able to mesh with the outer circumferential spline 14so of the second transmission shaft. The meshing state between the inner circumferential spline 26si of the second shift sleeve and the outer circumferential spline 14so of the second transmission shaft is switched according to a position of the second shift sleeve 26 in the direction of the rotational axis 18. As shown in FIG. 1, when the second shift sleeve 26 advances toward the second transmission shaft 14, the inner circumferential spline 26si and the outer circumferential spline 14so mesh with each other. This meshing causes the third transmission shaft 16 to rotate integrally with the second transmission shaft 14 via the second shift sleeve 26. As shown in FIG. 2, when the second shift sleeve 26 retreats from the second transmission shaft 14, the meshing between the inner circumferential spline 26si and the outer circumferential spline 14so is released, and the third transmission shaft 16 becomes rotatable with respect to the second transmission shaft 14.

The shift mechanism 10 further includes a drive drum 28, a first driven drum 30, and a second driven drum 32 for causing the first shift sleeve 24 and the second shift sleeve 26 to advance and retreat in the direction of the rotational axis 18. The drive drum 28, the first driven drum 30, and the second driven drum 32 have an approximately cylindrical shape and are concentrically arranged on the rotational axis 18. The drive drum 28 is supported by bearings 34 and 36 to be pivotable with respect to the case 20. The drive drum 28 has a gear 38 which is a spur gear or a helical gear, and this gear 38 meshes with a pinion (not shown) fixed to an output shaft of a shift motor (not shown). The drive drum 28 can thus be pivoted by the shift motor.

The first driven drum 30 is located on the inner circumferential side of the drive drum 28, and further, the first shift sleeve 24 described above is located on the inner circumferential side of the first driven drum 30. The first driven drum 30 has an inner circumferential spline 42 engaged with an outer circumferential spline 40 formed on the case 20. The outer circumferential spline 40 and the inner circumferential spline 42 cause the first driven drum 30 to stop rotating with respect to the case 20; that is, they constrain movement of the first driven drum 30 in the rotational direction. On the other hand, movement of the first driven drum 30 in the direction of the rotational axis 18 is allowed. The outer circumferential spline 40 and the inner circumferential spline 42 may be replaced with a detent key and a key groove.

The first driven drum 30 has a circumferentially extending retention groove 30g on its inner circumferential surface, and the retention groove 30g retains the outward flange 24f of the first shift sleeve therein. Thus, the first driven drum 30 and the first shift sleeve 24 translate along the rotational axis 18. On the other hand, the first shift sleeve 24 is rotatable in the rotational direction independently from the first driven drum 30. The outward flange 24f of the first shift sleeve may be replaced with a plurality of circumferentially arranged protrusions.

The second driven drum 32 is located on the outer circumferential side of the drive drum 28, and further, the second shift sleeve 26 described above is located on the outer circumferential side of the second driven drum 32. The second driven drum 32 has a detent arm 44 that extends radially outward. A receiving hole 44h is formed in the detent arm 44 to receive a detent pin 46 fixed to the case 20. By receipt of the detent pin 46 into the receiving hole 44h, thereby engaging the detent pin 46 with the detent arm 44, rotation of the second driven drum 32 with respect to the case 20 is stopped; that is, movement of the second driven drum 32 in the rotational direction is constrained. On the other hand, movement of the second driven drum 32 in the direction of the rotational axis 18 is allowed. The detent arm(s) 44 and the detent pin(s) 46 may be arranged in a single position or a plurality of positions in the circumferential direction.

The second driven drum 32 has a circumferentially extending retention groove 32g on its outer circumferential surface, and the retention groove 32g retains the inward flange 26f of the second shift sleeve therein. Thus, the second driven drum 32 and the second shift sleeve 26 translate along the rotational axis 18. On the other hand, the second shift sleeve 26 is rotatable in the rotational direction independently from the second driven drum 32. The inward flange 26f of the second shift sleeve may be replaced with a plurality of circumferentially arranged protrusions.

Figure 3:
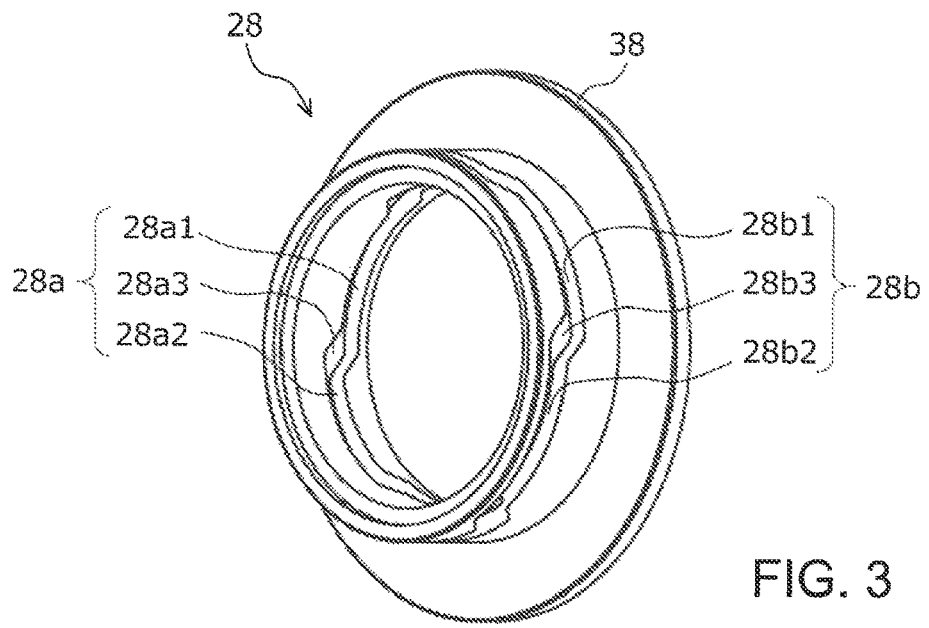
FIG. 3 is a perspective view showing a drive drum.
Figure 4:
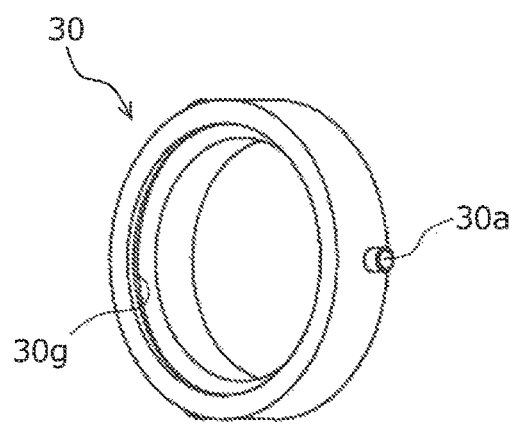
FIG. 4 is a perspective view showing a first driven drum.
Figure 5:
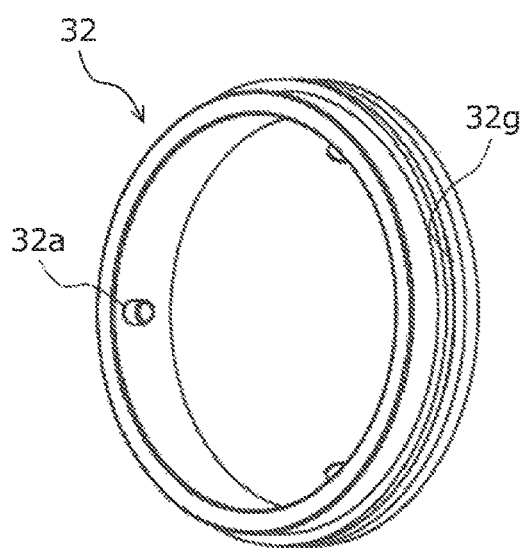
FIG. 5 is a perspective view showing a second driven drum.

The relation among the drive drum 28, the first driven drum 30, and the second driven drum 32 will be described with further reference to FIGS. 3 to 5. FIG. 3 is a perspective view showing the drive drum 28. FIG. 4 is a perspective view showing the first driven drum 30, and FIG. 5 is a perspective view showing the second driven drum 32. The teeth of the gear 38 are omitted from FIG. 3.

A first cam groove 28a is formed on the inner circumferential surface of the cylindrical portion of the drive drum 28, and a second cam groove 28b is formed on the outer circumferential surface thereof. The first cam groove 28a extends in an approximately circumferential direction and has an uneven cam profile in the direction along the rotational axis 18. Specifically, the first cam groove 28a includes a first portion 28a1 and a second portion 28a2 located at different positions in the axial direction and extending along the circumferential direction, and a third portion 28a3 connecting the first portion and the second portion and extending orthogonally to the circumferential direction. The first cam groove 28a has three turns of cam profiles. A driven pin 30a of the first driven drum 30 (hereinafter referred to as a first driven pin 30a) is engaged with the first cam groove 28a. When the first driven pin 30a comes into contact with one of the side wall surfaces of the first cam groove 28a, movement of the first driven drum 30 in one direction along the rotational axis direction is restricted. In addition, when the side surface of the first driven pin 30a comes into contact with the other one of the side wall surfaces of the first cam groove 28a, movement of the first driven drum 30 in the opposite direction is restricted. When the first driven pin 30a is engaged with the first portion 28a1 of the first cam groove, the first driven drum 30 is held in the retreated position, while when the first driven pin 30a is engaged with the second portion 28a2, the first driven drum 30 is held in the advanced position. When the first driven pin 30a is located at the third position 28a3 of the first cam groove, the first driven drum 30 moves along the rotational axis direction as the drive drum 28 pivots. Three first driven pins 30a are arranged at equal intervals so as to correspond to the three turns of cam profiles of the first cam groove 28a.

The second cam groove 28b extends in an approximately circumferential direction and has an uneven cam profile in the direction along the rotational axis 18. Specifically, the second cam groove 28b includes a first portion 28b1 and a second portion 28b2 located at different positions in the axial direction and extending along the circumferential direction, and a third portion 28b3 connecting the first portion and the second portion and extending orthogonally to the circumferential direction. The second cam groove 28b has three turns of cam profiles. A driven pin 32a of the second driven drum 32 (hereinafter referred to as a second driven pin 32a) is engaged with the second cam groove 28b. When the second driven pin 32a comes into contact with one of the side wall surfaces of the second cam groove 28b, movement of the second driven drum 32 in one direction along the rotational axis direction is restricted. In addition, when the side surface of the second driven pin 32a comes into contact with the other one of the side wall surfaces of the second cam groove 28b, movement of the second driven drum 32 in the opposite direction is restricted. When the second driven pin 32a is engaged with the first portion 28b1 of the second cam groove, the second driven drum 32 is held in the retreated position, while when the second driven pin 32a is engaged with the second portion 28b2, the second driven drum 32 is held in the advanced position. When the second driven pin 32a is located at the third position 28b3 of the second cam groove, the second driven drum 32 moves along the rotational axis direction as the drive drum 28 pivots. Three second driven pins 32a are arranged at equal intervals so as to correspond to the three turns of cam profiles of the second cam groove 28b. In addition, the cam profiles of the first cam groove 28a and those of the second cam groove 28b can be identical.

As the drive drum 28 pivots, the first and second driven pins 30a and 32a are driven according to the cam profiles of the first and second cam grooves 28a and 28b, particularly, according to the profiles of the third portions 28a3 and 28b3 of the cam grooves. Consequently, the first and second driven drums 30 and 32 move along the direction of the rotational axis 18. The timings of movement of the first and second driven drums 30 and 32 are determined according to the cam profiles of the first and second cam grooves 28a and 28b and circumferential positions of the first and second driven pins 30a and 32a.

As the first driven drum 30 advances toward the second transmission shaft 14; that is, to the left side in FIG. 1, the first shift sleeve 24 also advances toward the second transmission shaft 14, and the outer circumferential spline 24so of the first shift sleeve 24 is engaged with the inner circumferential spline 14si of the second transmission shaft 14. Thus, a connection state where the first transmission shaft 12 and the second transmission shaft 14 are connected is reached. As the first driven drum 30 moves in the opposite direction and retreats, the engagement between the outer circumferential spline 24so and the inner circumferential spline 14si is released, and a disconnection state where the first transmission shaft 12 and the second transmission shaft 14 are disconnected is reached. Thus, the first driven drum 30 advances and retreats in the rotational axis 18 direction, thereby switching the connection and disconnection states between the first transmission shaft 12 and the second transmission shaft 14.

As the second driven drum 32 advances toward the second transmission shaft 14; that is, to the left side in FIG. 1, the second shift sleeve 26 also advances toward the second transmission shaft 14, and the inner circumferential spline 26si of the second shift sleeve 26 is engaged with the outer circumferential spline 14so of the second transmission shaft 14. Thus, a connection state where the second transmission shaft 14 and the third transmission shaft 16 are connected is reached. As the second driven drum 32 moves in the opposite direction and retreats, the engagement between the inner circumferential spline 26si and the outer circumferential spline 14so is released, and a disconnection state where the first transmission shaft 12 and the second transmission shaft 14 are disconnected is reached. Thus, the second driven drum 32 advances and retreats in the rotational axis 18 direction, thereby switching the connection and disconnection states between the second transmission shaft 14 and the third transmission shaft 16.

When both the first driven drum 30 and the second driven drum 32 advance toward the second transmission shaft 14, the first transmission shaft 12 and the third transmission shaft 16 are connected via the second transmission shaft 14, and the first to third transmission shafts 12, 14, and 16 become integrally rotatable. When the first driven drum 30 advances, and the second driven drum 32 retreats, the first transmission shaft 12 and the second transmission shaft 14 are connected, and the third transmission shaft 16 becomes relatively rotatable with respect to the first and second transmission shafts 12 and 14. When the first driven drum 30 retreats, and the second driven drum 32 advances, the second transmission shaft 14 and the third transmission shaft 16 are connected, and the first transmission shaft 12 becomes relatively rotatable with respect to the second and third transmission shafts 14 and 16. When both the first driven drum 30 and the second driven drum 32 retreat, the first to third transmission shafts 12, 14, and 16 are separated and become pivotable independently from one another.

Figure 6:
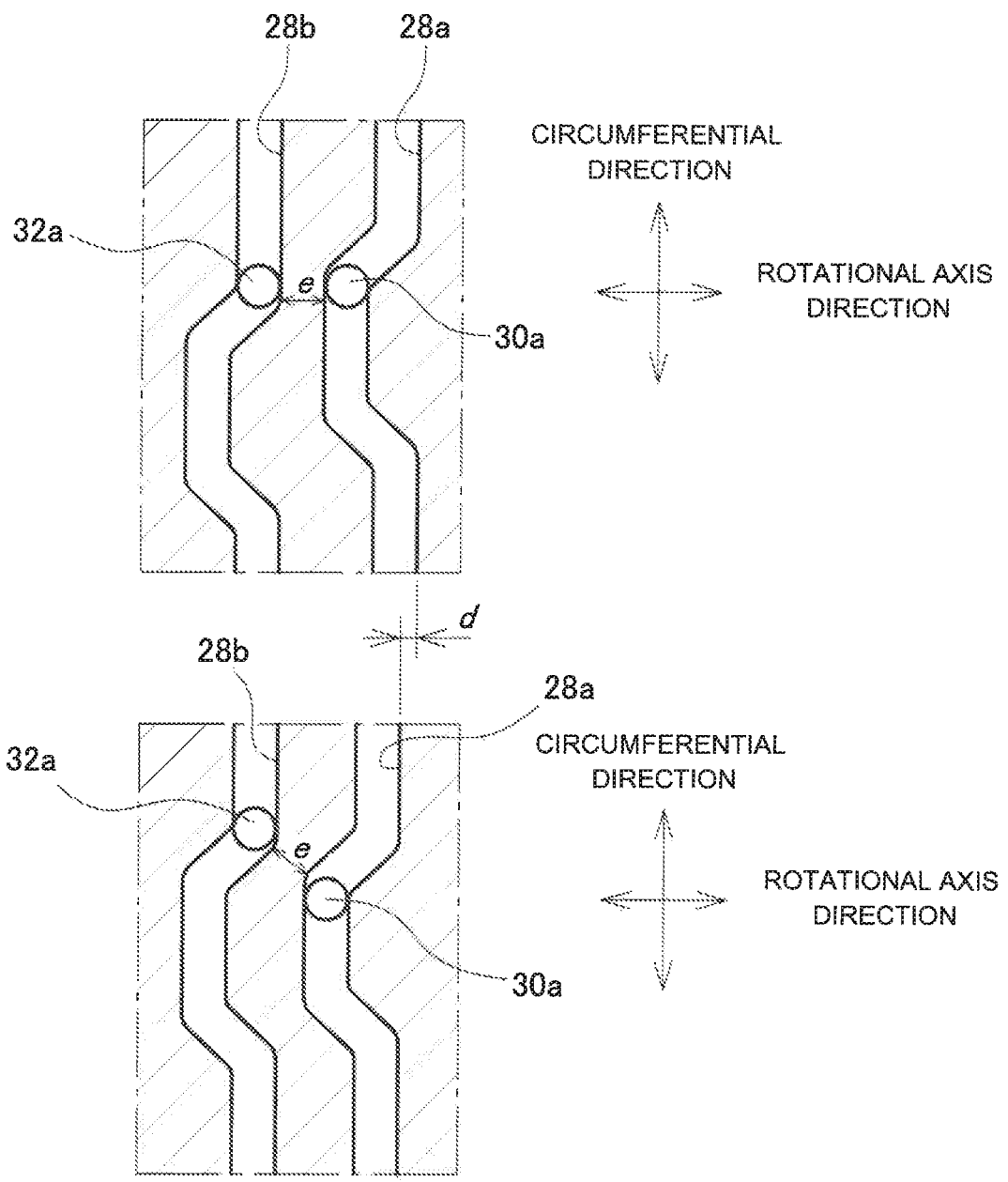
FIG. 6 is a diagram for explaining the relation between two parallel cam grooves.

FIG. 6 is a diagram for explaining an arrangement of the first and second cam grooves 28a and 28b and the first and second driven pins 30a and 32a. The cylindrical drive drum 28 is shown in a development diagram, and in the diagram, the up-and-down direction is the circumferential direction, and the right-and-left direction is the rotational axis direction. In the case shown on the upper side, the circumferential positions of the first driven pin 30a and the second driven pin 32a are aligned. In this case, in order to allow one of the first driven drum 30 and the second driven drum 32 to advance and the other one of them to retreat, it is necessary to arrange the circumferential positions of the first cam groove 28a and the second cam groove 28b having the same cam profiles to be shifted from each other. On the other hand, in the case shown on the lower side, the phases of the first cam groove 28a and the second cam groove 28b are aligned, and the positions of the first driven pin 30a and the second driven pin 32a are shifted from each other.

The first cam groove 28a and the second cam groove 28b are engraved on the front and back of the cylindrical portion of the drive drum 28, and they are adjacent in the direction of the rotational axis 18 when the thickness of the wall of the cylindrical portion is thin. The interval between the first cam groove 28a and the second cam groove 28b has a lower limit value e that is required for ensuring the strength of the drive drum 28. Assuming that the interval between the first cam groove 28a and the second cam groove 28b is a lower limit value e, it is found that, in the case shown on the lower side, the dimension for arranging the cam grooves can be reduced by a distance d as illustrated. Therefore, it is preferable that the first cam groove 28a and the second cam groove 28b are formed such that the cam profiles are circumferentially aligned, and that the first driven pin 30a and the second driven pin 32a are arranged to be circumferentially shifted from each other.

Figure 7:
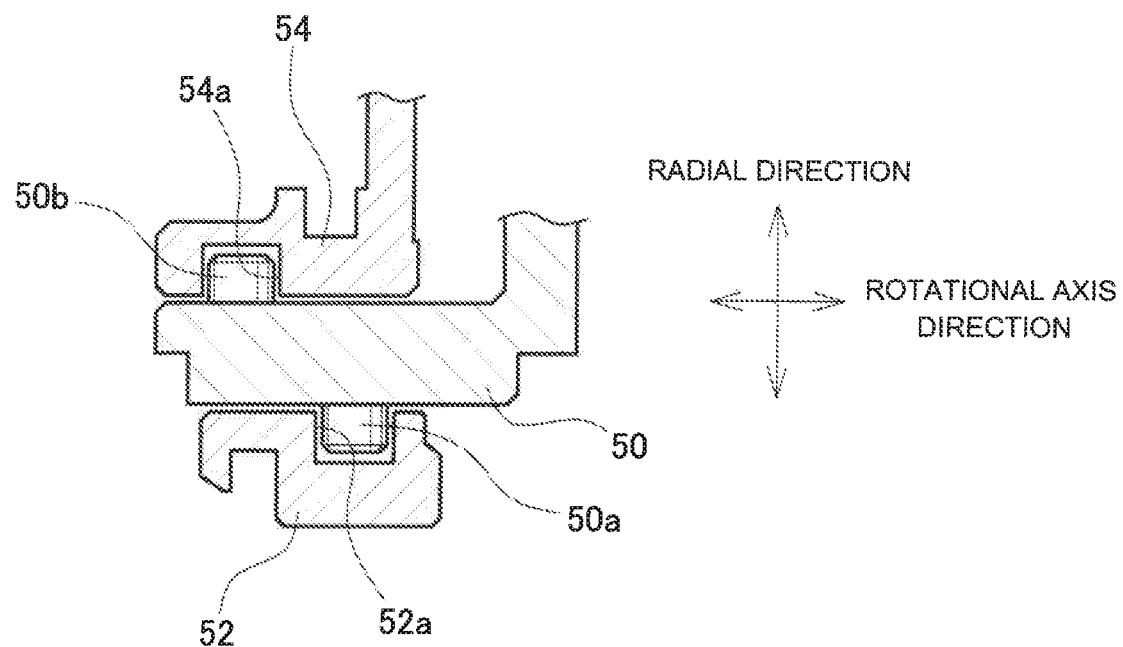
FIG. 7 is a diagram showing another aspect of the drive drum and the two driven drums.

FIG. 7 is a cross-sectional view showing another aspect of the drive drum and the driven drums. The components other than the drive drum and the driven drums are omitted because they are the same as those in the aspect described above. FIG. 7 shows a cross section corresponding to the cross section of the cross-sectional view shown in FIG. 1, and in FIG. 7, the right-and-left direction is the direction of the rotational axis 18, and the up-and-down direction is the radial direction.

Like the drive drum 28 and the first and second driven drums 30 and 32 described above, a drive drum 50, a first driven drum 52, and a second driven drum 54 have an approximately cylindrical shape and are concentrically arranged. In this aspect, the drive drum 50 has pins, and the first and second driven drums 52 and 54 have cam grooves formed thereon. The cylindrical portion of the drive drum 50 has a first drive pin 50a on its inner circumferential surface and has a second drive pin 50b on its outer circumferential surface. The first driven drum 52 has a circumferentially extending first cam groove 52a on its outer circumferential surface. The first cam groove 52a has, like the first cam groove 28a described above, a portion for holding the first driven drum 52 in the retreated position, a portion for holding the first driven drum 52 in the advanced position, and a portion for moving the first driven drum 52 along the rotational axis. The first drive pin 50a enters inside the first cam groove 52a and engages with it. The first drive pin 50a moves along the first cam groove 52a as the drive drum 50 pivots. The second driven drum 54 has a circumferentially extending second cam groove 54a on its inner circumferential surface. The second cam groove 54a has, like the second cam groove 28b described above, a portion for holding the second driven drum 54 in the retreated position, a portion for holding the second driven drum 54 in the advanced position, and a portion for moving the second driven drum 54 along the rotational axis. The second drive pin 50b enters inside the second cam groove 54a and engages with it. The second drive pin 50b moves along the second cam groove 54a as the drive drum 50 pivots. As the drive drum 50 pivots, the first and second drive pins 50a and 50b pivot, and the first and second driven drums 52 and 54 advance and retreat according to the cam profiles of the first and second cam grooves 52a and 54a engaged with the first and second drive pins 50a and 50b. As the first and second driven drums 52 and 54 advance and retreat, the first and second shift sleeves 24 and 26 advance and retreat, and the first to third transmission shafts 12, 14, and 16 are connected and disconnected.

Although, in FIG. 7, the first drive pin 50a and the second drive pin 50b are arranged to be shifted from each other in the direction along the rotational axis, and the first cam groove 52a and the second cam groove 54a are arranged to be shifted from each other in the direction along the rotational axis, they may be arranged to be aligned. In this case, the dimension in the rotational axis direction can be reduced.

Figure 8:
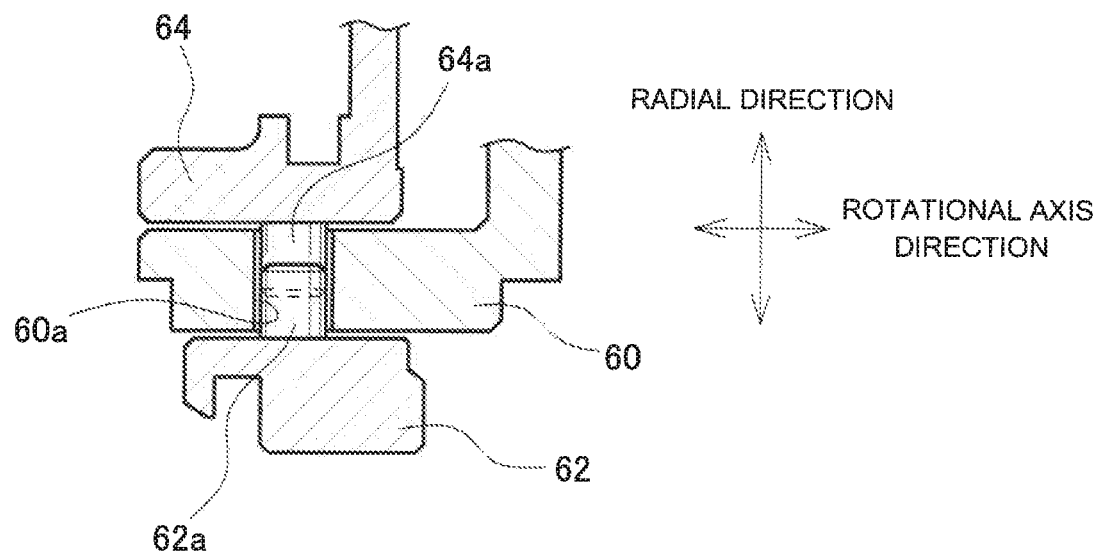
FIG. 8 is a diagram showing yet another aspect of the drive drum and the two driven drums.

FIG. 8 is a cross-sectional view showing yet another aspect of the drive drum and the driven drums. The components other than the drive drum and the driven drums are omitted because they are identical to those in the aspects described above. FIG. 8 shows a cross section corresponding to the cross section of the cross-sectional view shown in FIG. 1, and in FIG. 8, the right-and-left direction is the direction of the rotational axis 18, and the up-and-down direction is the radial direction.

Like the drive drum 28 and the first and second driven drums 30 and 32 described above, a drive drum 60, a first driven drum 62, and a second driven drum 64 have an approximately cylindrical shape and are concentrically arranged. In this aspect, the drive drum 60 has one cam groove to be shared, and the first and second driven drums 62 and 64 have pins formed thereon. The drive drum 60 has a circumferentially extending cam groove 60a in its cylindrical portion. The cam groove 60a is provided so as to extend from the inner circumferential surface of the cylindrical portion to the outer circumferential surface so as to penetrate the front and back of the cylindrical portion. The cam groove 60a is also located so as to be circumferentially divided. The cam groove 60a has, like the first cam groove 28a and the like described above, a portion for holding the first and second driven drums 62 and 64 in the retreated positions, a portion for holding the first and second driven drums 62 and 64 in the advanced positions, and a portion for moving the first and second driven drums 62 and 64 along the rotational axis. A first driven pin 62a is vertically provided on the outer circumferential surface of the first driven drum 62 and enters inside the cam groove 60a. In addition, a second driven pin 64a is vertically provided on the inner circumferential surface of the second driven drum 64 and enters inside the cam groove 60a. Thus, the cam groove 60a is shared by the first driven pin 62a and the second driven pin 64a. The first driven pin 62a and the second driven pin 64a are arranged to be circumferentially shifted from each other. As the drive drum 60 pivots, the cam groove 60a moves, and the first and second driven pins 62a and 64a engaged with the cam groove 60a move in the direction along the rotational axis according the cam profile. As the first and second driven pins 62a and 64a move, the first and second driven drums 62 and 64 advance and retreat, so that the first and second shift sleeves 24 and 26 advance and retreat, and the first to third transmission shafts 12, 14, and 16 are connected and disconnected.

Figure 9:
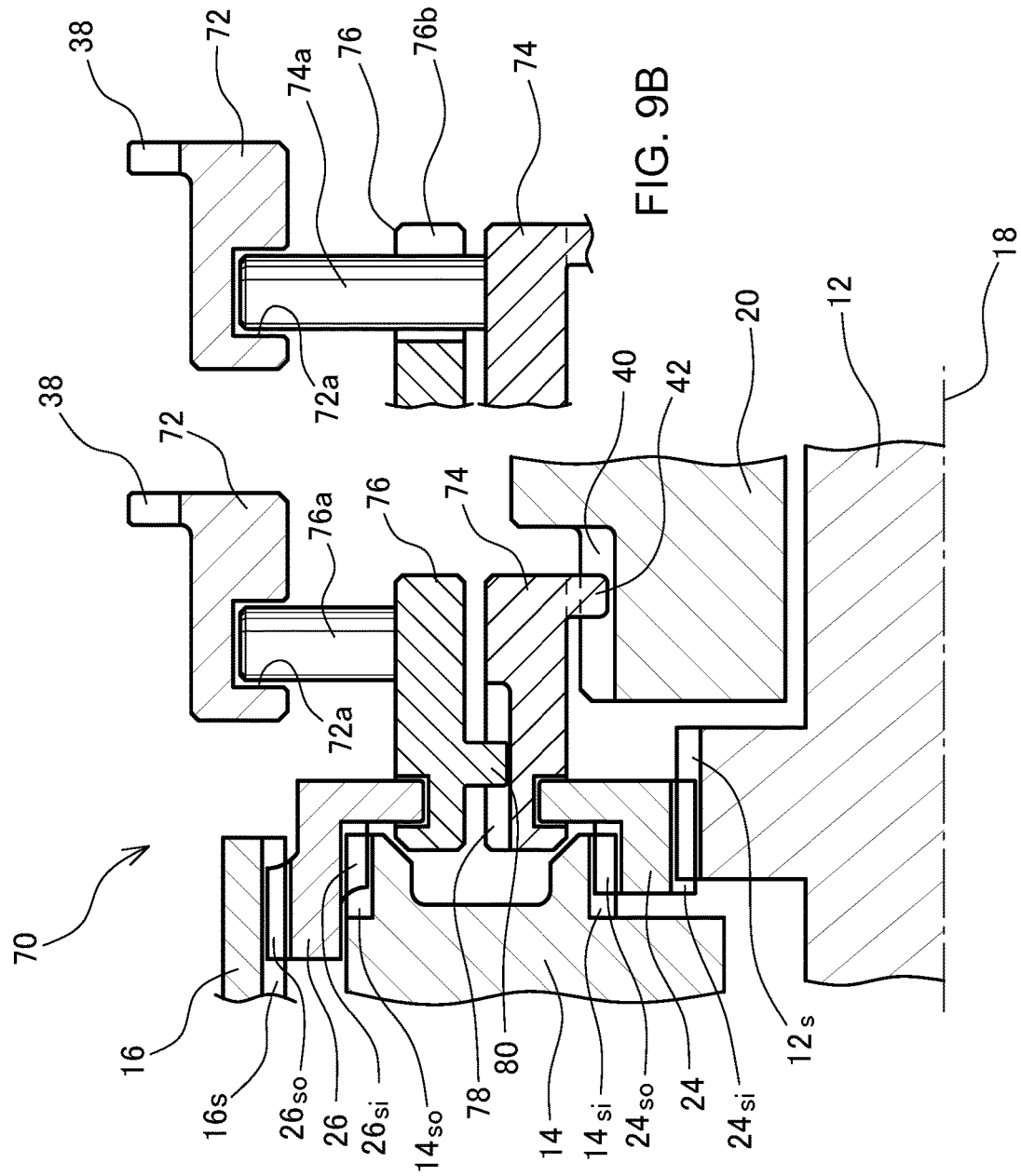
FIG. 9A is a cross-sectional view showing a schematic structure of a shift mechanism for a power transmission device according to another embodiment.
FIG. 9B is a cross-sectional view showing another cross section of the shift mechanism for the power transmission device shown in FIG. 9A.
Figure 10:
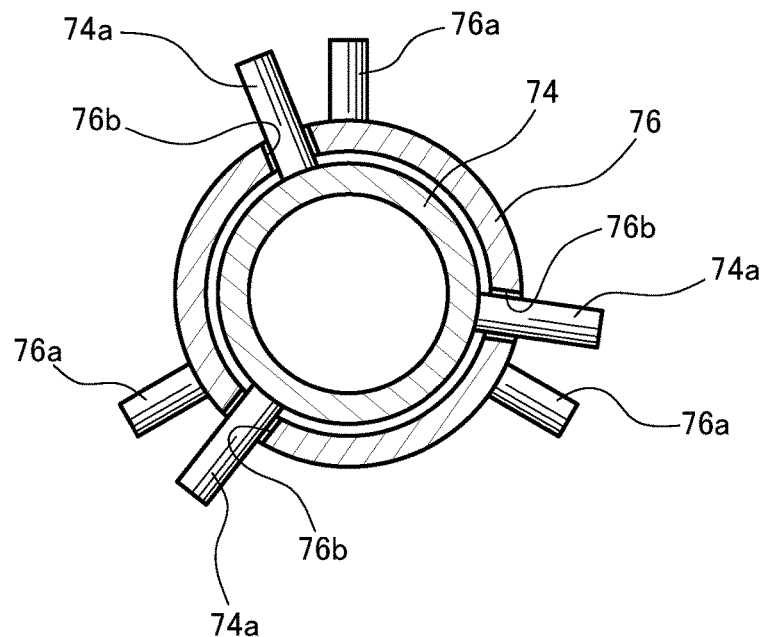
FIG. 10 is a diagram showing the relation between two driven drums and driven pins of the shift mechanism showing in FIGS. 9A and 9B.

FIGS. 9A, 9B, and 10 are diagrams showing the components of the shift mechanism 70, and the components that are identical to those in the shift mechanism 10 described above will be assigned the same reference numerals, and their description will be omitted. A drive drum 72, a first driven drum 74, and a second driven drum 76 have an approximately cylindrical shape and are concentrically arranged on the rotational axis 18. Both the first driven drum 74 and the second driven drum 76 are arranged inside the drive drum 72, and the first driven drum 74 is located inside the second driven drum 76.

A single, circumferentially extending cam groove 72a is formed on the inner circumferential surface of the cylindrical portion of the drive drum 72. The cam groove 72a has, like the first cam groove 28a and the like described above, a portion for holding the first and second driven drums 74 and 76 in the retreated positions, a portion for holding the first and second driven drums 74 and 76 in the advanced positions, and a portion for moving the first and second driven drums 74 and 76 along the rotational axis. The first driven drum 74 has a first driven pin 74a that is vertically provided on the outer circumferential surface of the cylindrical portion, and as shown in FIG. 9B, a tip of the first driven pin 74a enters inside the cam groove 72a of the drive drum and is engaged with it. A slit 76b is formed in the second driven drum 76 to allow the first driven pin 74a to penetrate therethrough. The second driven drum 76 has a second driven pin 76a that is vertically provided on the outer circumferential surface of the cylindrical portion, and as shown in FIG. 9A, a tip of the second driven pin 76a enters inside the cam groove 72a of the drive drum and is engaged with it. As shown in FIG. 10, the first driven pin 74a and the second driven pin 76a are arranged so as to be circumferentially shifted from each other.

The cylindrical portion of the first driven drum 74 has an outer circumferential spline 78 on its outer circumferential surface, and the cylindrical portion of the second driven drum 76 has an inner circumferential spline 80 on its inner circumferential surface. By engaging these outer and inner circumferential splines 78 and 80 with each other, the relative rotation of the first driven drum 74 and the second driven drum 76 is constrained. On the other hand, the first driven drum 74 and the second driven drum 76 can move individually in the direction along the rotational axis 18. So long as the first driven drum 74 and the second driven drum 76 are located in the movable range in the direction along the rotational axis 18, the outer circumferential spline 78 and the inner circumferential spline 80 are in an engaged state. Therefore, the relative rotation between the first driven drum 74 and the second driven drum 76 is always constrained. In addition, by engaging the inner circumferential spline 42 with the outer circumferential spline 40, the rotation of the first driven drum 74 with respect to the case 20 is constrained. For these reasons, the first and second driven drums 74 and 76 are always fixed relative to the case 20 in the rotational direction.

As the drive drum 72 pivots, the cam groove 72a moves, and the first and second driven pins 74a and 76a engaged with the cam groove 72a move in the rotational axis direction according the cam profile. As the first and second driven pins 74a and 76a move, the first and second driven drums 74 and 76 advance and retreat, so that the first and second shift sleeves 24 and 26 advance and retreat, and the first to third transmission shafts 12, 14, and 16 are connected and disconnected.

Instead of arranging the drive drum outside and the first and second driven drums inside, it is also possible to arrange the drive drum inside and the first and second driven drums outside. It is also possible to provide, on the inner circumferential surface or the outer circumferential surface of the cylindrical portion of the drive drum, two cam grooves that are adjacent in the direction along the rotational axis, and allow one of the cam grooves to be engaged with a driven pin vertically provided on the first driven drum, and the other one of the cam grooves to be engaged with a driven pin vertically provided on the second driven drum.

In the aspect where the two cam grooves are provided, by enabling one of the driven drums to pivot by a predetermined angle, the two driven drums can advance and retreat at the same timing and at different timings. This will be described by reference to the shift mechanism 10 shown in FIG. 1 and elsewhere.

Figure 11:
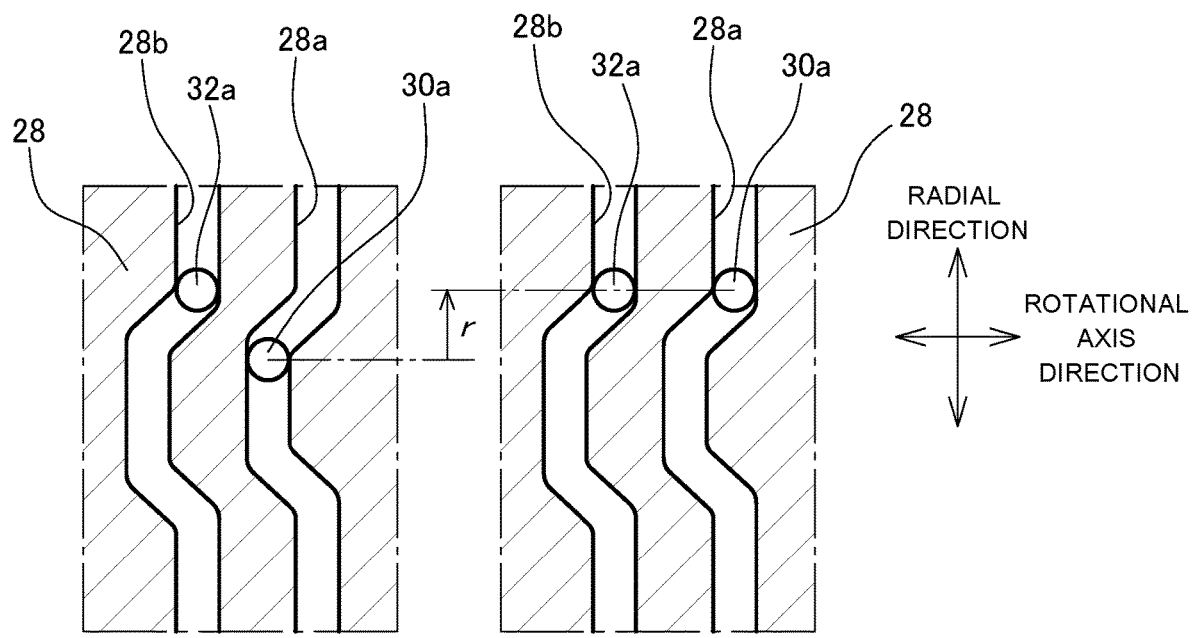
FIG. 11 is a diagram for explaining circumferential positions of the driven pins and timing of movement.

FIG. 11 is a diagram showing the relation between the first and second cam grooves 28a and 28b and the first and second driven pin 30a and 32a. The cam profiles of the first cam groove 28a and the second cam groove 28b are circumferentially aligned. In the shift mechanism 10 shown in FIG. 1, by allowing the outer circumferential spline 40 provided in the case 20 to be pivotable, it becomes possible to pivot the first driven drum 30. For example, it is possible to provide the outer circumferential spline 40 on a cylindrical sleeve which is pivotable relative to the case 20. By pivoting the outer circumferential spline 40, it is possible to switch between the states shown on the left side and the right side in FIG. 11.

In the case of the state shown on the left side in FIG. 11, the circumferential positions of the first driven pin 30a and the second driven pin 32a are shifted from each other, and therefore, as the drive drum 28 pivots, the first driven pin 30a and the second driven pin 32a move in the direction along the rotational axis 18 at different timings. Accordingly, the first driven drum 30 and the second driven drum 32 advance and retreat at different timings, which enables a state to be reached where the second transmission shaft 14 is connected to one of the first transmission shaft 12 and the third transmission shaft 16 but not to the other one of them. To reach a state where both the first transmission shaft 12 and the third transmission shaft 16 are connected to the second transmission shaft 14, the first transmission shaft 12 and the third transmission shaft 16 are both connected to the second transmission shaft 14 after one of them is connected.

When the first driven drum 30 is pivoted from the state shown on the left side in FIG. 11 by a length r shown in the same figure, the circumferential positions of the first driven pin 30a and the second driven pin 32a are aligned. This state is shown on the right side in FIG. 11. In this state, when the drive drum 28 is pivoted, the first driven pin 30a and the second driven pin 32a simultaneously move in the direction along the rotational axis 18. Accordingly, the first driven drum 30 and the second driven drum 32 advance and retreat at the same timing, and it is possible to simultaneously connect the first transmission shaft 12 and the third transmission shaft 16 to the second transmission shaft 14.

Instead of pivoting the outer circumferential spline 40, thereby pivoting the first driven drum 30, it is also possible to pivot the detent pin 46, thereby pivoting the second driven drum 32.

Regarding the first cam grooves 28a and 52a, the second cam grooves 28b and 54a, and the cam grooves 60a and 72a described above, one or both of the portions for holding the driven drums corresponding to these cam grooves in the retreated positions (for example, the first portion 28a1 of the first cam groove 28a) and the portions for holding the driven drums in the advanced positions (for example, the second portion 28a2 of the first cam groove 28a) can be omitted. In this case, other components undertake the function of holding the driven drums in the retreated positions or the advanced positions.

Figure 12:
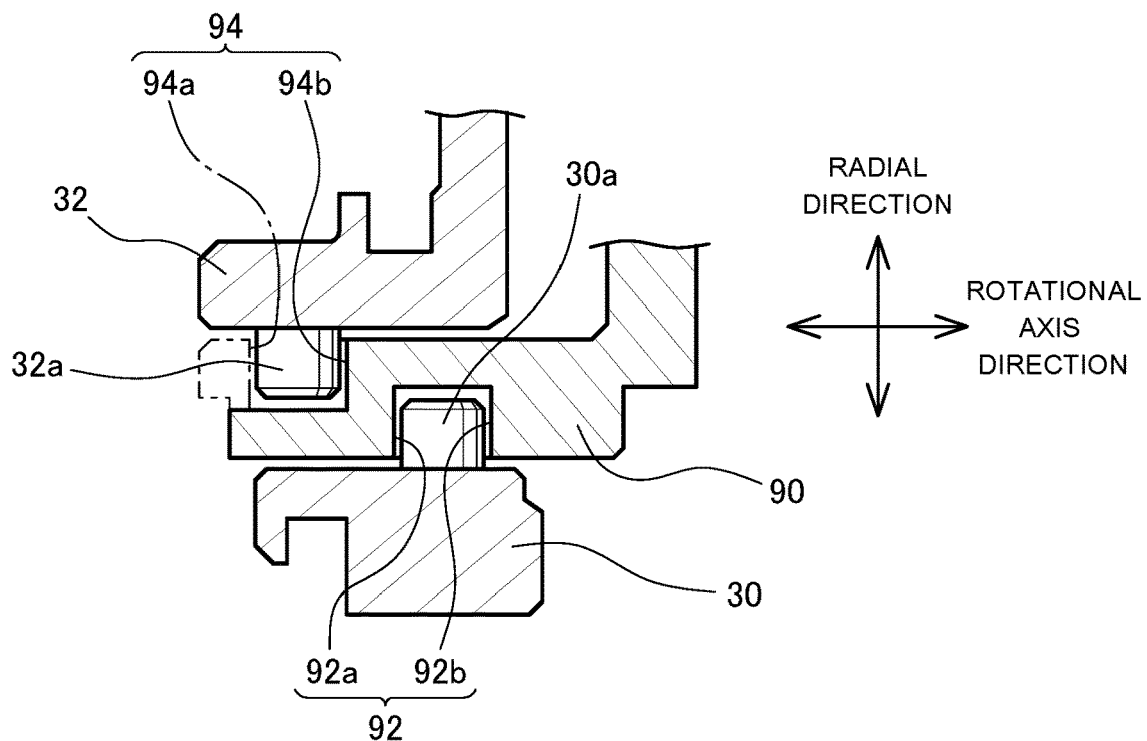
FIG. 12 is a diagram showing further aspect of the drive drum, illustrating the drive drum and the two driven drums when the three transmission shafts are connected.
Figure 13:
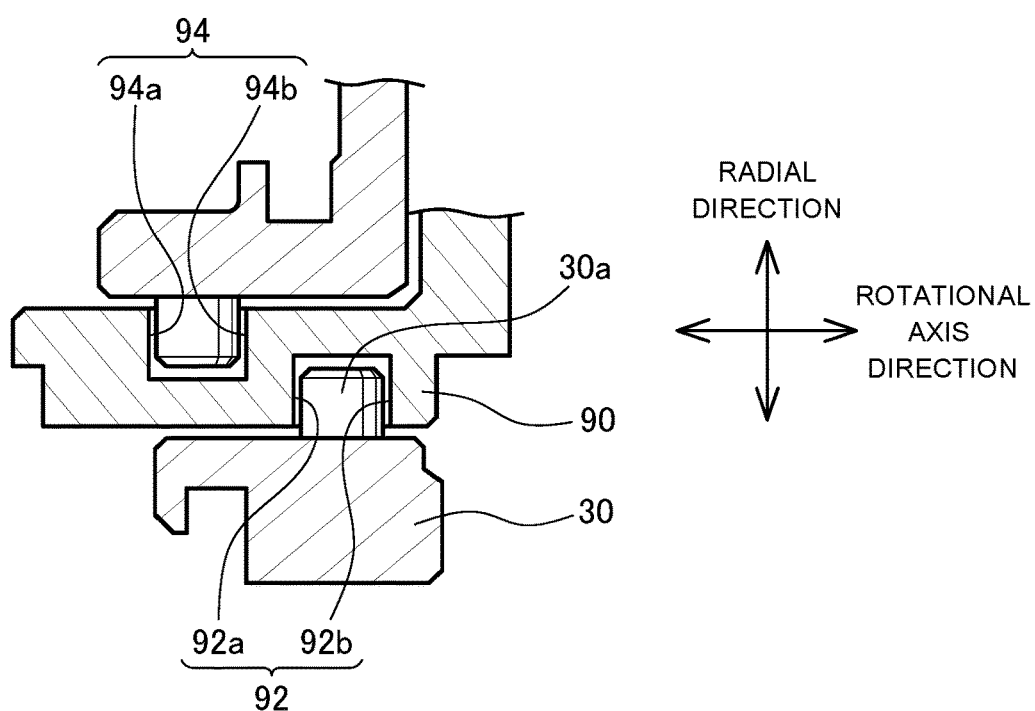
FIG. 13 is a diagram showing the drive drum and the two driven drums shown in FIG. 12 when the three transmission shafts are disconnected.
Figure 14:
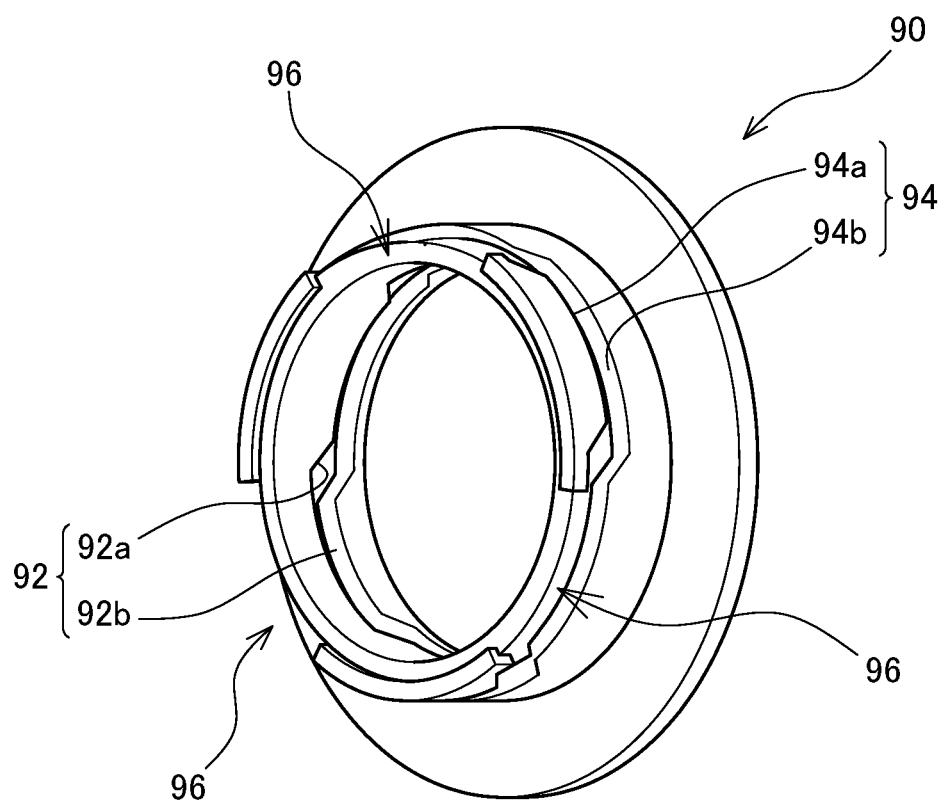
FIG. 14 is a perspective view of the drive drum shown in FIG. 12.
Figure 15:
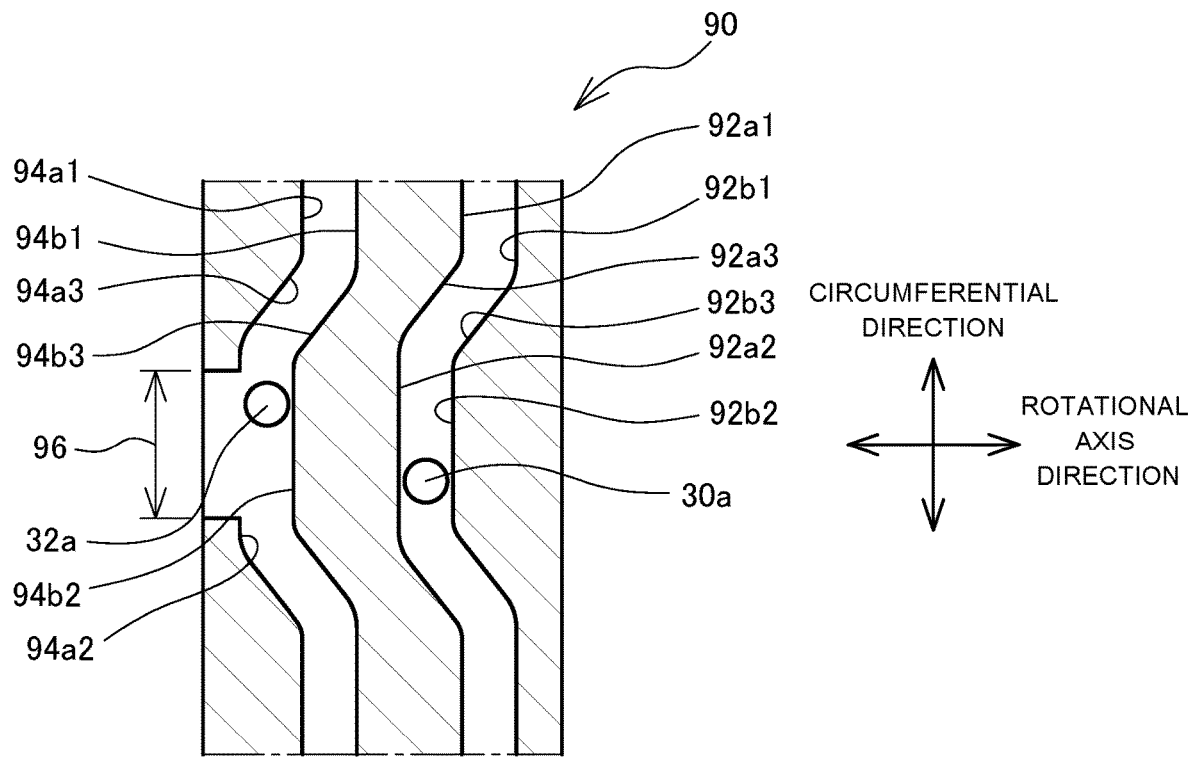
FIG. 15 is a diagram showing a cam structure of the drive drum shown in FIG. 12.

FIGS. 12 to 15 are schematic diagrams showing other aspects of the drive drum. A drive drum 90 differs from the drive drum 28 described above in its cam-related structure. The components other than the drive drum are the same as those in the shift mechanism 10 shown in FIGS. 1 and 2, and thus, their description will be omitted. FIGS. 12 and 13 show cross sections including the rotational axis 18 (see FIGS. 1 and 2). FIG. 12 shows that the first and second driven drums 30 and 32 are advanced, and FIG. 13 shows that the first and second driven drums 30 and 32 are retreated. FIG. 14 shows the drive drum 90 alone. FIG. 15 is a diagram showing a cam structure of the drive drum 90, illustrating the cylindrical drive drum 90 developed in a plane. In FIG. 15, the up-and-down direction is the circumferential direction, and the right-and-left direction is the rotational axis direction.

The drive drum 90 includes a first cam structure 92 to be engaged with the first driven pin 30a of the first driven drum 30 and a second cam structure 94 to be engaged with the second driven pin 32a of the second driven drum 32. The first cam structure 92 has a first cam surface 92a and a second cam surface 92b that come into contact with the side surface of the first driven pin 30a of the first driven drum 30. The first cam surface 92a and the second cam surface 92b face each other with the first driven pin 30a therebetween and extend in the generally circumferential direction. Specifically, the first cam surface 92a and the second cam surface 92b include first portions 92a1 and 92b1 and second portions 92a2 and 92b2 located at different positions in the axial direction and extending along the circumferential direction, and third portions 92a3 and 92b3 connecting the first portions and the second portions and extending orthogonally to the circumferential direction. The first cam surface 92a is positioned on the second transmission shaft 14 side of the first driven pin 30a (the left side in FIGS. 12, 13 and 15) and restricts movement of the first driven pin 30a to the left side, thereby restricting movement of the first driven drum 30 in the advancing direction. The second cam surface 92b is positioned on the opposite side to the second transmission shaft 14 with respect to the first driven pin 30a (the right side in FIGS. 12, 13 and 15) and restricts movement of the first driven pin 30a to the right side, thereby restricting movement of the first driven drum 30 in the retreating direction. When the first driven pin 30a is positioned between the first portion 92a1 of the first cam surface and the first portion 92b1 of the second cam surface, the first driven drum 30 is held in the retreated position. In addition, when the first driven pin 30a is positioned between the second portion 92a2 of the first cam surface and the second portion 92b2 of the second cam surface, the first driven drum 30 is held in the advanced position. Further, when the first driven pin 30a is positioned between the third portion 92a3 of the first cam surface and the third portion 92b3 of the second cam surface, the first driven drum 30 moves in the rotational axis direction as the drive drum 90 pivots.

The second cam structure 94 has a third cam surface 94a and a fourth cam surface 94b that come into contact with the side surface of the second driven pin 32a of the second driven drum 32. The fourth cam surface 94b extends in the generally circumferential direction, and specifically, it includes a first portion 94b1 and a second portion 94b2 located at different positions in the axial direction and extending along the circumferential direction, and a third portion 94*b*3 connecting the first portion and the second portion and extending orthogonally to the circumferential direction. The fourth cam surface 94*b* is positioned on the opposite side to the second transmission shaft 14 with respect to the second driven pin 32*a* (the right side in FIGS. 12, 13 and 15) and restricts movement of the second driven pin 32*a* to the right side, thereby restricting movement of the second driven drum 32 in the retreating direction. The third cam surface 94*a* has a first portion 94*a*1 and a third portion 94*a*3 facing the first portion 94*b*1 and the third position 94*b*3 of the fourth cam surface and facing them with the second driven pin 32*a* therebetween. The third cam surface 94*a* lacks at least a portion of a second portion 94*a*2 facing the second portion 94*b*2 of the fourth cam surface. The region where the third cam surface 94*a* is lacking will be referred to as a missing region 96. The third cam surface 94*a* is positioned, in the region where this surface is provided, on the second transmission shaft 14 side of the second driven pin 32*a* (the left side in FIGS. 12, 13 and 15) and restricts movement of the second driven pin 32*a* to the left side, thereby restricting movement of the second driven drum 32 in the advancing direction. When the second driven pin 32*a* is positioned between the first portion 94*a*1 of the third cam surface and the first portion 94*b*1 of the fourth cam surface, the second driven drum 32 is held in the retreated position. In addition, when the second driven pin 32*a* is positioned between the third portion 94*a*3 of the third cam surface and the third portion 94*b*3 of the fourth cam surface, the second driven drum 32 moves along the rotational axis direction as the drive drum 90 pivots. Further, when the second driven pin 32*a* is in the missing region 96 of the third cam surface, the second cam structure 94 restricts movement of the first driven drum 30 only in the retreating direction. Movement of the second shift sleeve 26 (see FIGS. 1 and 2) in the advancing direction can be restricted by the second transmission shaft 14 or the third transmission shaft 16.

Figures 16A, 16B:
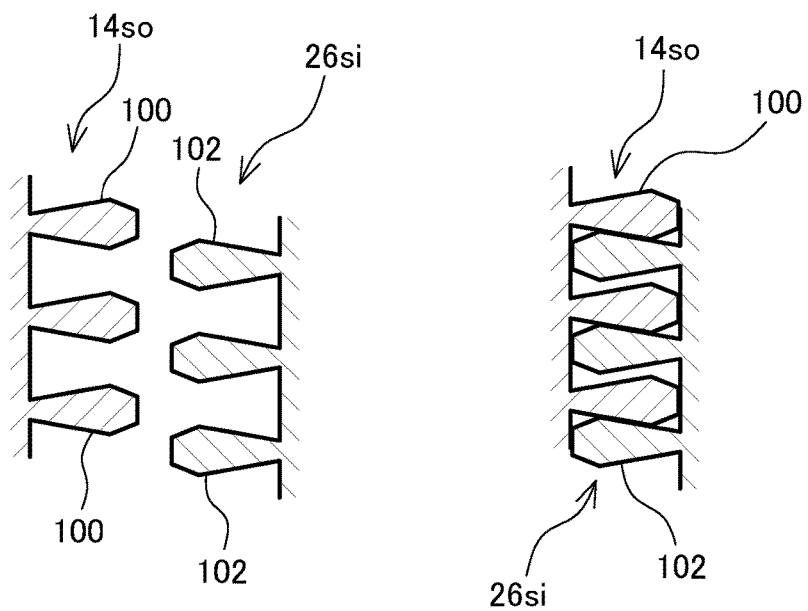
FIG. 16A is a diagram showing an example of the shape of the spline teeth.
FIG. 16B is a diagram showing an example of the shape of the spline teeth.

It is known to provide tooth surfaces of meshing splines with reverse tapers to prevent the splines from falling out. FIGS. 16A and 16B are diagrams showing the shape of the reverse tapered splines, illustrating circumferentially arranged teeth 100 and 102 developed in a plane. FIG. 16A shows the splines in an unmeshed state, and FIG. 16B shows the splines in a meshed state. FIGS. 16A and 16B illustrate the outer circumferential spline 14*so* of the second transmission shaft 14 and the inner circumferential spline 26*si* of the second shift sleeve 26 which is to mesh with the outer circumferential spline 14*so*. As shown, regarding the teeth 100 and 102, the tooth surfaces are formed to be inclined such that the tooth thickness becomes larger as it is closer to the end face. Once these teeth 100 and 102 mesh with each other, the force acting on one tooth surface functions to draw the other spline inside. In other words, with reference to FIG. 1, when the inner circumferential spline 26*si* of the second shift sleeve meshes with the outer circumferential spline 14*so* of the second transmission shaft 14, the leftward force acts on the second shift sleeve 26. This force causes the inward flange 26*f* of the second shift sleeve 26 to contact the left side wall surface of the retention groove 32*g* of the second driven drum 32. While leftward movement of the second driven drum 32 is restricted, the inward flange 26*f* and the second driven drum 32 slide and generate friction. When the drive drum 90 is used, and the second driven drum 32 is in the advanced position, the second driven pin 32*a* is positioned in the missing region 96 of the third cam surface, and thus, leftward movement of the second driven drum 32 is not restricted. This allows suppression of friction between the inward flange 26*f* and the second driven drum 32.

In addition, setting the missing region 96 in the third cam surface 94*a* allows a reduction in the weight of the drive drum 90. Further, it is also possible to make the space between the second portion 92*a*2 of the first cam surface and the first driven pin 30*a* larger to suppress sliding of the first shift sleeve 24 and the first driven drum.

Figure 17:
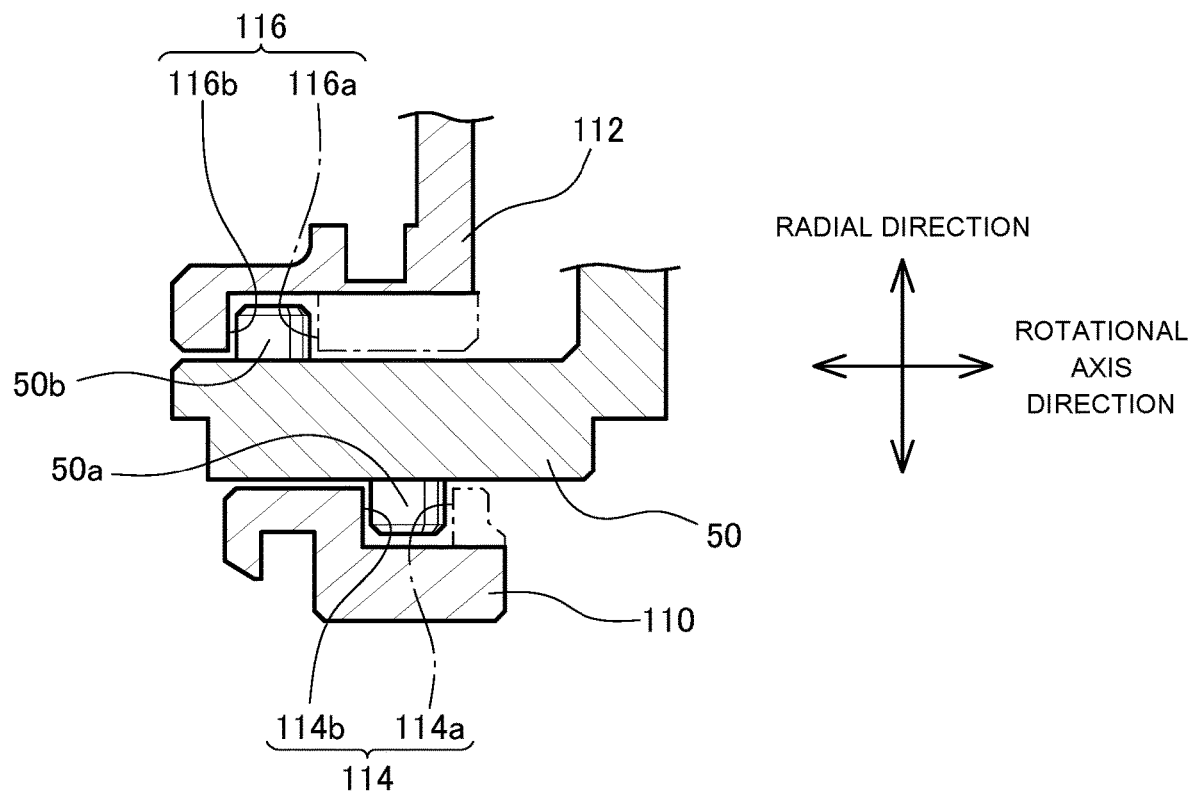
FIG. 17 is a diagram showing a further aspect of the two driven drums.

FIG. 17 is a schematic diagram showing another aspect of the first and second driven drums. The structure shown in FIG. 17 corresponds to the structure shown in FIG. 7, and a first driven drum 110 and a second driven drum 112 differ from the first driven drum 52 and the second driven drum 54 described above in their cam-related structures. The structure of the drive drum 50 is not changed from that shown in FIG. 7. It will be indicated by the same reference numerals, and the description thereof will be omitted. FIG. 17 shows the first and second driven drums 110 and 112 in the advanced state.

The first driven drum 110 includes a first cam structure 114 to be engaged with the first drive pin 50*a* of the drive drum 50. The first cam structure 114 has a first cam surface 114*a* and a second cam surface 114*b* that come into contact with the side surface of the first drive pin 50*a*. The first cam structure 114 has a similar structure to the second cam structure 94 shown in FIGS. 12 to 15. Specifically, the second cam surface 114*b* includes a first portion and a second portion located at different positions in the axial direction and extending along the circumferential direction, and a third portion connecting the first portion and the second portion and extending orthogonally to the circumferential direction. The second cam surface 114*b* is positioned on the second transmission shaft 14 side of the first driven pin 50*a* (the left side in FIG. 17) and restricts rightward movement of the first driven drum 110 with respect to the first drive pin 50*a*; that is, movement in the retreating direction. The first cam surface 114*a* has a first portion and a third portion facing the first portion and the third position of the second cam surface 114*b* and facing them with the first drive pin 50*a* therebetween. The first cam surface 114*a* lacks at least a portion of its second portion facing the second portion of the second cam surface 114*b*. The first cam surface 114*a* is positioned, in the region where this surface is provided, on the opposite side to the second transmission shaft 14 with respect to the first drive pin 50*a* (the right side in FIG. 17) and restricts leftward movement of the first driven drum 110 with respect to the first drive pin 50*a*; that is, movement in the advancing direction. When the first drive pin 50*a* is positioned between the first portions of the first cam surface 114*a* and the second cam surface 114*b*, the first driven drum 110 is held in the retreated position. In addition, when the first drive pin 50*a* is positioned between the third portions of the first cam surface 114*a* and the second cam surface 114*b*, the first driven drum 110 moves along the rotational axis direction as the drive drum 50 pivots. Further, when the first drive pin 50*a* is in the missing region of the first cam surface 114*a*, the first cam structure 114 restricts movement of the first driven drum 110 only in the retreating direction. Movement of the first shift sleeve 24 (see FIGS. 1 and 2) in the advancing direction can be restricted by the first transmission shaft 12 or the second transmission shaft 14.

The second driven drum 112 includes a second cam structure 116 to be engaged with the second drive pin 50*b* of the drive drum 50. The second cam structure 116 has a third cam surface 116*a* and a fourth cam surface 116*b* that come into contact with the side surface of the second drive pin 50b. The second cam structure 116 has a similar structure to the second cam structure 94 shown in FIGS. 12 to 15. Specifically, the fourth cam surface 116b includes a first portion and a second portion located at different positions in the axial direction and extending along the circumferential direction, and a third portion connecting the first portion and the second portion and extending orthogonally to the circumferential direction. The fourth cam surface 116b is positioned on the second transmission shaft 14 side of the second drive pin 50b (the left side in FIG. 17) and restricts rightward movement of the second driven drum 112 with respect to the second drive pin 50b; that is, movement in the retreating direction. The third cam surface 116a has a first portion and a third portion facing the first portion and the third position of the fourth cam surface 116b and facing them with the second drive pin 50b therebetween. The third cam surface 116a lacks at least a portion of its second portion facing the second portion of the fourth cam surface 116b. The third cam surface 116a is positioned, in the region where this surface is provided, on the opposite side to the second transmission shaft 14 with respect to the second drive pin 50b (the right side in FIG. 17) and restricts leftward movement of the second driven drum 112 with respect to the second drive pin 50b; that is, movement in the advancing direction. When the second drive pin 50b is positioned between the first portions of the third cam surface 116a and the fourth cam surface 116b, the first driven drum 110 is held in the retreated position. In addition, when the second drive pin 50b is positioned between the third portions of the third cam surface 116a and the fourth cam surface 116b, the second driven drum 112 moves along the rotational axis direction as the drive drum 50 pivots. Further, when the second drive pin 50b is in the missing region of the third cam surface 116a, the second cam structure 116 restricts movement of the second driven drum 112 only in the retreating direction. Movement of the second shift sleeve 26 (see FIGS. 1 and 2) in the advancing direction can be restricted by the second transmission shaft 14 or the third transmission shaft 16.

When the first driven drum 110 is in the advanced position, its further movement in the advancing direction is not restricted, and it is thus possible to reduce friction from sliding of the first driven drum 110 and the first shift sleeve 24 caused by providing the splines with reverse tapers. Similarly, when the second driven drum 112 is in the advanced position, its further movement in the advancing direction is not restricted, and it is thus possible to reduce friction from sliding of the second driven drum 112 and the second shift sleeve 26 caused by providing the splines with reverse tapers. Although, in the above example, both of the first cam structure 114 and the second cam structure 116 are provided with the regions lacking the cam surfaces, it may be the case that only one of them is provided with the region.

Figure 18:
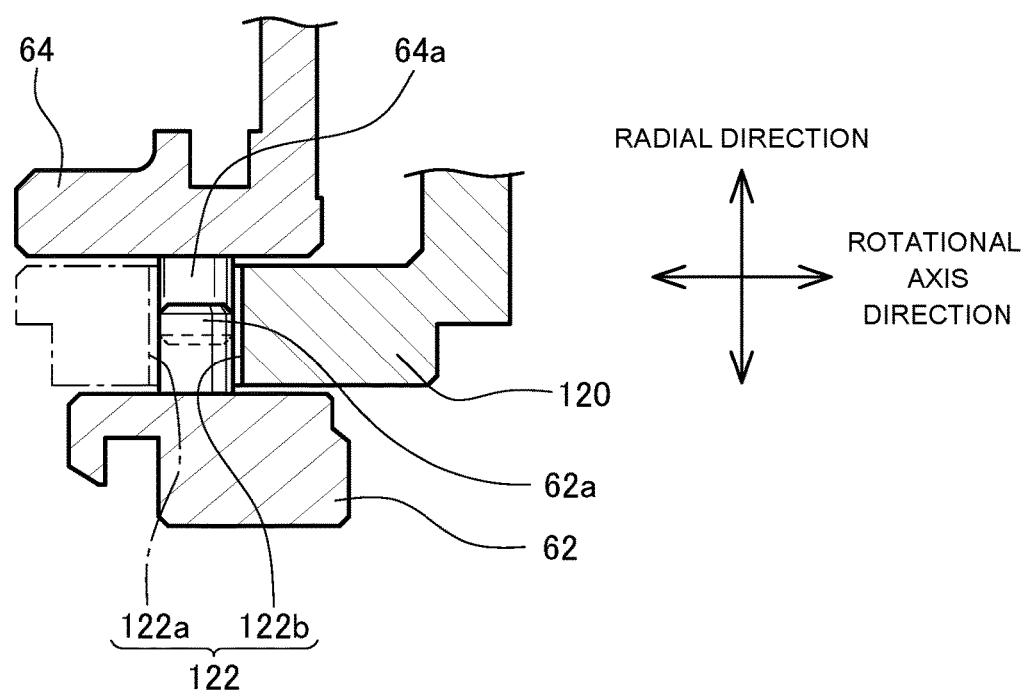
FIG. 18 is a diagram showing still a further aspect of the drive drum.

FIG. 18 is a schematic diagram showing another aspect of the drive drum. The structure shown in FIG. 18 corresponds to the structure shown in FIG. 8, and a drive drum 120 differs from the drive drum 60 described above in its cam-related structure. The structures of the first driven drum 62 and the second driven drum 64 are not changed from those shown in FIG. 8. They will be indicated by the same reference numerals, and the description thereof will be omitted. FIG. 18 shows the first and second driven drums 62 and 64 in the advanced state.

The drive drum 120 includes a cam structure 122 with which the first driven pin 62a of the first driven drum 62 and the second driven pin 64a of the second driven drum 64 are both engaged. The cam structure 122 has a first cam surface 122a and a second cam surface 122b that come into contact with the side surface of the first driven pin 62a and the side surface of the second driven pin 64a. The cam structure 122 has a similar structure to the second cam structure 94 shown in FIGS. 12 to 15. Specifically, the second cam surface 122b includes a first portion and a second portion located at different positions in the axial direction and extending along the circumferential direction, and a third portion connecting the first portion and the second portion and extending orthogonally to the circumferential direction. The second cam surface 122b is positioned on the opposite side to the second transmission shaft 14 with respect to the first driven pin 62a and the second driven pin 64a (the right side in FIG. 18) and restricts movement of the first and second driven pins 62a and 64a to the right side, thereby restricting movement of the first and second driven drums 62 and 64 in the retreating direction. The first cam surface 122a has a first portion and a third portion that face the first portion and the third position of the second cam surface 122b and face them with the first and second driven pins 62a and 64a therebetween. The first cam surface 122a lacks at least a portion of its second portion facing the second portion of the second cam surface 122b. The first cam surface 122a is positioned, in the region where this surface is provided, on the second transmission shaft 14 side of the first and second driven pins 62a and 64a (the left side in FIG. 18) and restricts movement of the first and second driven pins 62a and 64a to the left side, thereby restricting movement of the first and second driven drums 62 and 64 in the advancing direction. When the first and second driven pins 62a and 64a are positioned between the first portions of the first cam surface 122a and the second cam surface 122b, the first and second driven drums 62 and 64 are held in the retreated position. In addition, when the first and second driven pins 62a and 64a are positioned between the third portions of the first cam surface 122a and the second cam surface 122b, the first and second driven drums 62 and 64 move along the rotational axis direction as the drive drum 120 pivots. Further, when the first and second driven pins 62a and 64a are in the missing region of the first cam surface 122a, the cam structure 122 restricts movement of the first and second driven drums 62 and 64 only in the retreating direction. Movement of the first and second shift sleeves 24 and 26 (see FIGS. 1 and 2) in the advancing direction can be restricted by the first, second, and third transmission shafts 12, 14, and 16.

When the first driven drum 62 is in the advanced position, its further movement in the advancing direction is not restricted, and it is thus possible to reduce friction from sliding of the first driven drum 62 and the first shift sleeve 24 caused by providing the splines with reverse tapers. Similarly, when the second driven drum 64 is in the advanced position, its further movement in the advancing direction is not restricted, and it is thus possible to reduce friction from sliding of the second driven drum 64 and the second shift sleeve 26 caused by providing the splines with reverse tapers.

Figures 19A, 19B:
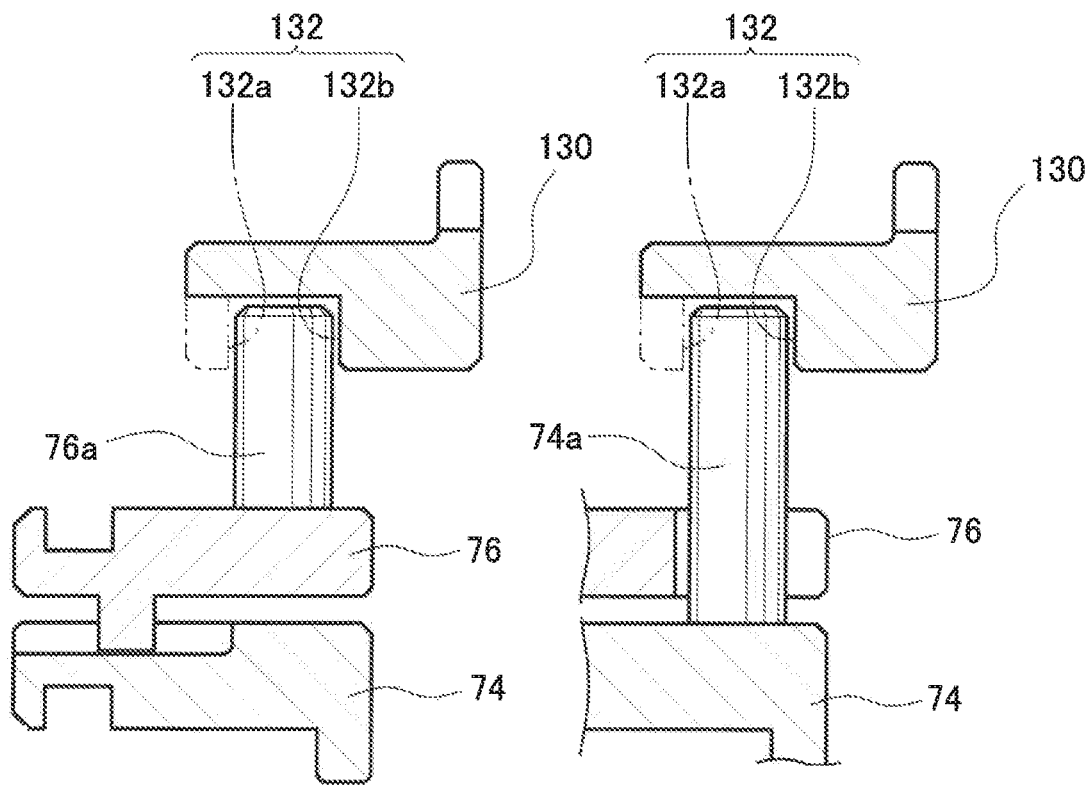
FIG. 19A is a diagram showing yet a further aspect of the drive drum.
FIG. 19B is a cross-sectional view showing another cross section of the further aspect of the driven drum shown in FIG. 19A.

FIGS. 19A and 19B are schematic diagrams showing another aspect of the drive drum. The structure shown in FIGS. 19A and 19B correspond to the structure shown in FIGS. 9A and 9B, and a drive drum 130 differs from the drive drum 72 described above in its cam-related structure. The structures of the first driven drum 74 and the second driven drum 76 are not changed from those shown in FIGS. 9A and 9B. They will be indicated by the same reference numerals, and the description thereof will be omitted. FIGS. 19A and 19B show the first and second driven drums 74 and 76 in the advanced state.

The drive drum 130 includes a cam structure 132 with which the first driven pin 74a of the first driven drum 74 and the second driven pin 76a of the second driven drum 76 are both engaged. The cam structure 132 has a first cam surface 132a and a second cam surface 132b that come into contact with the side surface of the first driven pin 74a and the side surface of the second driven pin 76a. The cam structure 132 has a similar structure to the second cam structure 94 shown in FIGS. 12 to 15. Specifically, the second cam surface 132b includes a first portion and a second portion located at different positions in the axial direction and extending along the circumferential direction, and a third portion connecting the first portion and the second portion and extending orthogonally to the circumferential direction. The second cam surface 132b is positioned on the opposite side to the second transmission shaft 14 with respect to the first driven pin 74a and the second driven pin 76a (the right side in FIGS. 19A and 19B) and restricts movement of the first and second driven pins 74a and 76a to the right side, thereby restricting movement of the first and second driven drums 74 and 76 in the retreating direction. The first cam surface 132a has a first portion and a third portion that face the first portion and the third position of the second cam surface 132b and face them with the first and second driven pins 74a and 76a therebetween. The first cam surface 132a lacks at least a portion of its second portion facing the second portion of the second cam surface 132b. The first cam surface 132a is positioned, in the region where this surface is provided, on the second transmission shaft 14 side of the first and second driven pins 74a and 76a (the left side in FIGS. 19A and 19B) and restricts movement of the first and second driven pins 74a and 76a to the left side, thereby restricting movement of the first and second driven drums 74 and 76 in the advancing direction. When the first and second driven pins 74a and 76a are positioned between the first portions of the first cam surface 132a and the second cam surface 132b, the first and second driven drums 74 and 76 are held in the retreated position. In addition, when the first and second driven pins 74a and 76a are positioned between the third portions of the first cam surface 132a and the second cam surface 132b, the first and second driven drums 74 and 76 move along the rotational axis direction as the drive drum 130 pivots. Further, when the first and second driven pins 74a and 76a are in the missing region of the first cam surface 132a, the cam structure 132 restricts movement of the first and second driven drums 74 and 76 only in the retreating direction. Movement of the first and second shift sleeves 24 and 26 (see FIGS. 1 and 2) in the advancing direction can be restricted by the first, second, and third transmission shafts 12, 14, and 16.

When the first driven drum 74 is in the advanced position, its further movement in the advancing direction is not restricted, and it is thus possible to reduce friction from sliding of the first driven drum 74 and the first shift sleeve 24 caused by providing the splines with reverse tapers. Similarly, when the second driven drum 76 is in the advanced position, its further movement in the advancing direction is not restricted, and it is thus possible to reduce friction from sliding of the second driven drum 76 and the second shift sleeve 26 caused by providing the splines with reverse tapers.

The invention claimed is:

1. A clutch mechanism comprising:
a transmission shaft, and another transmission shaft that are concentrically arranged on a rotational axis;
a shift sleeve that advances and retreats along the rotational axis and connects and disconnects the transmission shaft and the other transmission shaft;
a drive drum that is provided so as to be coaxial with the rotational axis and pivotable about the rotational axis; and
a driven drum that is located on the rotational axis so as to be concentric with the drive drum and moves along the rotational axis as the drive drum pivots, thereby causing the shift sleeve to advance and retreat.

2. The clutch mechanism according to claim 1, wherein
a cam groove is provided on a circumferential surface of the drive drum, and
the driven drum has a driven pin engaged with the cam groove, and when the driven pin is driven according to a profile of the cam groove as the drive drum pivots, the driven drum moves along the rotational axis.

3. The clutch mechanism according to claim 1, wherein
the drive drum has a drive pin on its circumferential surface, and
the driven drum is provided with a cam groove engaged with the drive pin, and the driven drum moves along the rotational axis according to a profile of the cam groove as the drive pin pivots in accordance with pivoting of the drive drum.

4. The clutch mechanism according to claim 1, wherein
the driven drum has a driven pin vertically provided on its circumferential surface, and
the drive drum is provided with
a cam surface that comes into contact with the side surface of the driven pin to restrict movement of the driven drum in the advancing direction, and
another cam surface that comes into contact with the side surface of the driven pin to restrict movement of the driven drum in the retreating direction,
when the driven pin is driven according to profiles of the cam surface and the other cam surface as the drive drum pivots, the driven drum moves along the rotational axis, and
the cam surface lacks a portion that restricts, when the driven drum is in the advanced position, movement of the driven drum.

5. The clutch mechanism according to claim 1, wherein
the drive drum has a drive pin vertically provided on its circumferential surface,
the driven drum is provided with
a cam surface that comes into contact with the side surface of the drive pin to restrict movement of the driven drum in the advancing direction, and
another cam surface that comes into contact with the side surface of the drive pin to restrict movement of the driven drum in the retreating direction,
as the drive pin pivots in accordance with pivoting of the drive drum, the driven drum moves along the rotational axis according to the profiles of the cam surface and the other cam surface, and
the cam surface lacks a portion that restricts, when the driven drum is in the advanced position, movement of the driven drum.

* * * * *